United States Patent
Yi et al.

(10) Patent No.: US 7,327,734 B2
(45) Date of Patent: Feb. 5, 2008

(54) PACKET DATA SERVICE IN RADIO COMMUNICATION SYSTEM

(75) Inventors: Seung June Yi, Seoul (KR); Woon Young Yeo, Kunpo (KR); Su Jin Park, Kunpo (KR)

(73) Assignee: LG Electronics Inc., Seoul (KR)

( * ) Notice: Subject to any disclaimer, the term of this patent is extended or adjusted under 35 U.S.C. 154(b) by 966 days.

(21) Appl. No.: 10/190,935

(22) Filed: Jul. 8, 2002

(65) Prior Publication Data
US 2003/0007490 A1    Jan. 9, 2003

(30) Foreign Application Priority Data
Jul. 9, 2001   (KR) ............................... 2001-40877

(51) Int. Cl.
*H04L 12/56* (2006.01)
(52) U.S. Cl. .................................... 370/394; 370/350
(58) Field of Classification Search .................. 370/394
See application file for complete search history.

(56) References Cited

U.S. PATENT DOCUMENTS

| | | | |
|---|---|---|---|
| 6,574,473 B2 * | 6/2003 | Rinne et al. ................ | 455/436 |
| 6,725,040 B2 * | 4/2004 | Jiang ........................... | 455/436 |
| 7,009,951 B2 * | 3/2006 | Kalliokulju et al. ........ | 370/331 |
| 2001/0007137 A1 | 7/2001 | Suumaki et al. | |
| 2003/0008653 A1 | 1/2003 | Jiang | |

FOREIGN PATENT DOCUMENTS

| | | |
|---|---|---|
| EP | 0 777 396 A1 | 4/1997 |
| WO | WO 01/60017 A1 | 8/2001 |
| WO | WO 02/15524 A1 | 2/2002 |

OTHER PUBLICATIONS

ETSI TS 123 060 V4.0.0, "Digital Cellular Telecommunications System (Phase 2+)," Mar. 2001, pp. 73-84.
ERSI TS 125 323 V4.0.0 "Universal Mobile Telecommunications System (UMTS)," Mar. 2001, pp. 1-19.
ETSI TS 125 323 V4.3.0, "Universal Mobile Telecommunications System (UMTS)," Dec. 2001, pp. 1-20.

* cited by examiner

*Primary Examiner*—Brian Nguyen
(74) *Attorney, Agent, or Firm*—Lee, Hong, Degerman, Kang & Schmadeka

(57) ABSTRACT

Disclosed are a method and a device for offering a packet data service during to a handover of a user terminal from one radio network controller to another. To avoid the loss of data during SRNS relocation, there is provided a method for checking the validity of the next expected receive PDCP sequence number sent from a receiver PDCP layer with the send PDCP sequence number of the first transmitted but not yet acknowledged PDCP SDU and the send PDCP sequence number first unsent PDCP SDU of the sender PDCP layer. A PDCP protocol structure is reconstructed to support a lossless SRNS relocation in the packet service domain, and control information and operational procedure therefore are newly defined. As a result, the lossless SRNS relocation is achieved in the packet service domain and the mobility of data communication is ensured.

45 Claims, 15 Drawing Sheets

FIG.8
RELATED ART
PDCP No Header PDU
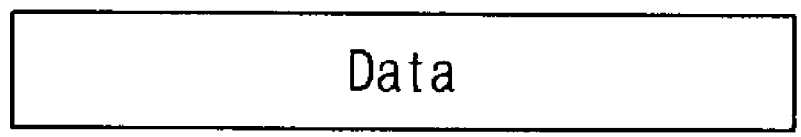
PDCP Data PDU
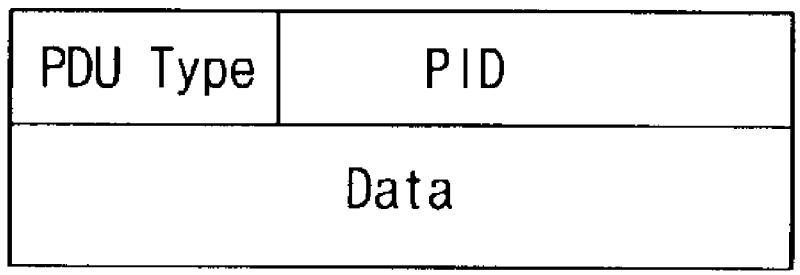
PDCP SeqNum PDU
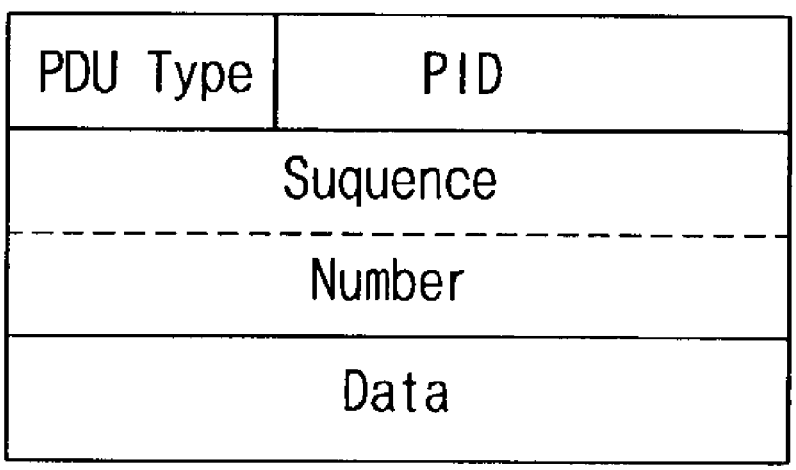

PACKET DATA SERVICE IN RADIO COMMUNICATION SYSTEM

CROSS REFERENCE TO RELATED ART

This application claims the benefit of Korean Patent Application No. 2001-0040877, filed on Jul. 9, 2001, which is hereby incorporated by reference in its entirety.

BACKGROUND OF THE INVENTION

1. Field of the Invention

The present invention relates to a packet data service during a handover or handoff of a user terminal in a mobile communication system, and particularly, to a method of performing Serving Radio Network Subsystem (SRNS) relocation and a structure and an operation method of a packet data convergence protocol layer (PDCP) which is able to support the SRNS relocation in a packet service area.

2. Description of the Related Art

Recently, a Third Generation Partnership Project (hereinafter, referred to as 3GPP) was formed by national or international or regional standardization organizations, such as ETSI of Europe, ARIB/TTC of Japan, T1 of USA, CWTS of China, and TTA of Korea in order to make a detailed specification of a European type third generation mobile communication system (IMT-2000 system). This system is called as UMTS (Universal Mobile Telecommunications System). UMTS adopted WCDMA (Wideband Code Divisional Multiple Access) technology as a radio access network technology. UMTS is being developed based on the General Packet Radio Service (GPRS) making its root on a packet-switched network and further based on the Global System for Mobile Communications (GSM) making its root on a circuit-switched network. In addition, the third generation mobile communication systems which are able to provide multimedia services, such as voice, video, and data, are under development in the above partnership.

The 3GPP includes five technical specification groups (TSG) in order to administer the project and to rapidly and effectively develop the technology. Each respective TSG takes charge of development, approval, and management for a reference specification of related area. Among those groups, a radio access network (RAN) group develops functional requirements of a terminal and UMTS Terrestrial Radio Access Network (UTRAN), and develops specifications for an interface under an object of defining a new radio access network in the third generation mobile communication system. And a core network (CN) group develops specifications for function, requirement, and interface of the CN in order to connect the UTRAN to a circuit-switched backbone network or to a packet-switched backbone network.

FIG. 1 shows a network structure of a packet-switched domain suggested by the TSG-RAN and TSG-CN.

As referring to FIG. 1, the UTRAN comprises a plurality of radio network subsystems (RNS). Each RNS comprises a plurality of Node Bs and one radio network controller (RNC).

In addition, the CN has different structure according to the adopted switching mode (packet-switched network or circuit-switched network). In case of the packet-switched network considered in the present invention, the CN comprises a plurality of serving GPRS support nodes (SGSN) and one gateway GPRS support node (GGSN).

Functions of respective components shown in FIG. 1 will be described as follows. The Node B functions as a connecting point where a User Equipment (UE), (commonly called as a mobile station or a terminal), connects to the UTRAN, and RNC assigns and manages radio resources to respective UEs.

The RNC can be classified into a control RNC (CRNC) for managing shared radio resources, and a serving RNC (SRNC) for managing dedicated radio resources allocated to the respective terminals.

In the view point of a certain UE (terminal), the RNS where the SRNC of the above UE is located is called as serving RNS (SRNS). The SGSN routes information transmitted from the UTRAN to CN, and GGSN functions as a gateway, which passes the information from the UTRAN to other CNs in case that an information destination is not the present CN, but another network. A packet domain network (PDN) is a back bone network of the packet-switched domain for supporting the connection between the other networks in the packet service domain.

Data interfaces on the respective parts have different names as follows. For example, an interface between the UE and the Node B is "Uu" interface, between Node B and the RNC is "Iub" interface, between the RNC and the RNC is "Iur" interface, between the RNC and the SGSN is "Iu" interface, and between the SGSN and the GGSN or the SGSN and the SGSN is "Gn" interface.

FIG. 1 is an exemplary example of network structures. The Iur interface may not exist as a real interface, and the Iur interface may exist between the RNCs of different SGSN. Also, the Gn between the SGSNs may exist or may not exist.

The network structure shown in FIG. 1 can be presented as a layered structure as shown in FIGS. 2 and 3. FIG. 2 is a view showing a user plane (U-plane) layer structure for transmitting user data. FIG. 3 is a view showing a control plane (C-plane) layer structure for transmitting a controlling signal.

FIG. 4 is a view showing detailed layers of a UE side or a UTRAN side supporting the Uu interface, which is a radio interface (an air interface), shown in FIGS. 2 and 3.

As shown therein, the U-plane comprises a packet data convergence protocol layer (PDCP), a radio link control layer (RLC), a medium access control layer (MAC), (these three layers work as a Layer 2 in the Open Systems Interconnection scheme) and a physical layer (L1 or Layer 1) as a Layer 1 of the Open Systems Interconnection scheme. In addition, the C-plane comprises: a radio resource control layer (RRC), an RLC layer, an MAC layer, and an L1 layer.

The L1 layer (physical layer) provides the upper layers with an information transfer service using various radio accessing technologies. The L1 layer is connected to the MAC layer via a transport channel, and the data between the MAC layer and the L1 layer are exchanged through the transport channel. The transport channel is divided into a dedicated transport channel if the channel is used by a terminal exclusively and a common transport channel if the channel is shared by a plurality of terminals.

The MAC layer provides a MAC parameter relocation service for locating and relocating the radio resource. The MAC layer is connected to the RLC layer through a logical channel, and different kinds of logical channels are provided according to the kinds of information which are transmitted. Generally, a control channel is used when the information on the C-plane is transmitted, and a traffic channel is used in case that the information on the U-plane is transmitted.

The RLC layer provides services of establishing or releasing the radio link. Also, the RLC layer performs the segmentation and reassembly functions of RLC service data unit (SDU) descended from an upper layer on the U-plane. The size of the RLC SDU is controlled on the RLC layer, and the header information is added to the RLC SDU to make a protocol data unit (PDU) form, and then, the PDU is transmitted (delivered) to the MAC layer.

The PDCP layer is an upper layer of the RLC layer and changes the data which is transmitted through the IP network protocol, such as IPv4 or IPv6, into a form which is suitable for the RLC layer to transmit the data. Besides, the PDCP layer reduces controlling information which is used in a wired network, but unnecessarily large to the radio network to transmit the data effectively through the radio interface. The above function is called as a header compression, and can be used to reduce the header information used in TCP/IP.

The RRC layer provides an information broadcast service for broadcasting system information to all terminals located on an optional area. Also, the RRC layer processes C-plane signals for control signal exchanged in a Layer 3, and performs establishing, re-configuring, and releasing radio resource between a terminal and the UTRAN. Particularly, the RRC has the functions of establishing, re-configuring, and releasing a radio bearer (RB), and functions of allocating, relocating, and releasing the radio resources needed in radio resource connection. The RB means a service provided by a Layer 2 for transmitting data between the terminal and the UTRAN. In other words, establishing a RB means a process in which a protocol layer and channel characteristic for providing a predetermined service in a radio area are determined, and parameters and operational method are set respectively.

The Iu interface can be characterized in different types according to the functions. The Iu-CS (Iu circuit service) is used in the circuit-switched service, and Iu-PS (Iu packet service) is used in the packet-switched service.

The Iu-PS will be described because the present invention makes reference to the packet switched domain. The Iu-PS supports the packet data transmission. The GPRS tunneling protocol for the user plane (GTP-U) layer is used on the U-plane, and is used especially for transmitting user data in the packet switched area. In addition, the packet switched network in the UMTS is based on the GPRS, and therefore, the GTP-U is also used in the UMTS.

A radio access network application part (RANAP) layer is used in the C-plane of the Iu interface, and transmits the control information. The RANAP layer is used in both the Iu-CS and Iu-PS.

FIG. 5 illustrates a SRNS relocation procedure. The SRNS relocation means a process of changing SRNC from a source RNC to a target RNC in order to set an Iu connection point between the UE and the CN with a shorter path, in case that a handover is generated between RNS by the UE.

In FIG. 5, the old SGSN connected with the source RNC is different from the new SGSN connected with the target RNC. However, the old SGSN and the new SGSN may be the same. That is, the SRNC may be changed without the SGSN being changed.

The SRNS relocating procedure not permitting a data loss is called as lossless SRNS relocation (LSR). The LSR is important in transmitting the packet data. The reason is that a data loss in the packet data means the loss of the entire data since such packet data is not useable although some losses in real time data, such as voice data, are permissible and cause little adverse affect.

Therefore, the 3GPP has been making efforts to come up with the complete LSR procedure, however, it leaves much to be desired.

Hereinafter, the typical packet data transmitting/receiving process of a wireless communication systems supported by the 3GPP standard or other standards will be described, by using as an example of downloading the packet data in the UE.

FIG. 2 is the reference view and FIG. 6 is a view showing the packet data flowing on the U-plane.

First, the GGSN requests the SGSN to which the UE is connected to set a radio access bearer (RAB) in order to transmit the data which is required by the UE. The SGSN which received the above request assigns the RAB to set the transmission path of the data between the UE and itself.

When the transmission path from the GGSN to the UE is set, the GGSN starts the packet data transmission. The packet data generated in upper layers (IP, PPP etc.) are encapsulated as GTP-U PDU (Protocol Data Unit) in the GTP-U layer of the GGSN and transmitted to the RNC of the UTRAN. The GTP-U layer of the UTRAN RNC receives the above GTP-U PDU, and decapsulates the GTP-U PDU to extract the packet data. Generally, the GTP-U layer transmits the GTP-U PDU after adding GTP-U sequence numbers on the GTP header for in-sequence delivery and for reliable delivery.

Thereafter, the GTP header is removed from the GTP-PDU, and the remaining packet data is transmitted to the PDCP layer of the UTRAN. In addition, the PDCP layer performs header compression for the packet data (PDCP SDU in FIG. 6). Herein, the header compression means downsizing of an IP header on the packet of the normal IP protocol. The header compression is performed for the respective packets (PDCP SDU). The PDCP SDU subjected to the header compression becomes PDCP PDU.

The PDCP PDU is transmitted to the UE by passing through the RLC, MAC, and L1. The transmitted PDCP PDU is delivered to the PDCP of the UE by passing through the L1, MAC, and RLC in the UE. Then, a header decompression is made using reverse algorithm to that of the header compression. Then, the extracted PDCP SDU is transferred to the upper layer (PPP, IP). IP packets from UE side can be transmitted to the UTRAN side by similar manner.

FIG. 7 is a view showing a PDCP structure which controls the transmitting/receiving of packet data in radio interface (air interface) among the layers related to the packet data flowing.

As shown therein, one PDCP entity exists per respective radio bearer (RB), and one PDCP entity is connected to one RLC entity.

The PDCP entity may be connected to three types of RLC entity, that is, AM (Acknowledged mode, a mode for confirming by receiving side whether or not the data is transmitted), UM (unacknowledged mode, a mode in which the data transmission is not confirmed by the receiving side), and TM (transparent mode, a mode for passing the data transparently). However, in case that the LSR is used, the PDCP entity is only connected to the RLC AM entity in order to ensure the in-sequence delivery of the PDCP PDU.

The operation of PDCP is varied according to which mode among those three kinds of mode is used in the RLC entity to which the PDCP is connected. Herein, a case that the PDCP is connected to the RLC AM entity which supports the LSR will be described.

When the PDCP SDU is delivered from the GTP-U, the PDCP performs the header compression using a compression algorithm. The header compression is performed for the IP (internet protocol) header in the PDCP SDU, and two algorithms of RFC2507 and RFC3095 used for the header compression are defined presently.

The algorithm which will be used in the header compression is informed by the RRC when the PDCP entity is established. In addition, various compression algorithms may be used, or the compression may not be made (i.e., by passed).

When the PDCP SDU has passed through the header compression process, the PDCP SDU becomes the PDCP PDU. After that, if the PDCP supports the LSR, the respective PDCP PDU is being numbered, and the sequence numbers are managed by the PDCP. The sequence number of the PDCP PDU of sender is increased by 1 whenever one PDCP PDU is descended to the RLC, and the sequence number of PDCP PDU of the receiver is increased by 1 whenever one PDCP PDU is delivered from the RLC or the discard information indicating that one PDCP PDU (=RLC SDU) is discarded is delivered from the RLC. The PDCP manages the sequence number (SN) in order to prevent a loss of PDCP SDU when the SRNS relocation is occurred.

FIG. 8 is a view showing the types of PDCP PDU. There are three types of PDU generated by the PDCP. A PDCP-No-Header PDU uses the PDCP SDU as the PDCP PDU directly without overhead information. The above PDU is used in case that the header compression is already made at the upper layer, and the PDCP transfers the PDCP SDU to the RLC transparently.

Second, a PDCP data PDU is mainly used in the PDCP, and notifies the header compression type, which is used for the corresponding PDCP PDU, through a PID field.

The PDU type field notifies whether the corresponding PDU is the PDCP data PDU or the PDU is a PDCP SeqNum PDU which will be described later.

Third, the PDCP SeqNum PDU is used when the PDCP data PDU is transmitted with a sequence number.

The PDCP SeqNum PDU is sent for coincidence of RSN (Receive Sequence Number) of receiver and SSN (Send Sequence Number) of sender in case that the SN of a PDCP PDU of the sender PDCP entity and of the receiver PDCP entity are not synchronized with each other. The RSN preferably corresponds to the next expected sequence number, and the SSN corresponds to the first unsent sequence number.

The above process of coinciding the SNs of the PDCP entities by transmitting the SeqNum PDU is called as an SN synchronization process.

If the SRNS relocation is occurred when the packet data is transmitted/received, the PDCP performs different operations according to the modes.

There are two modes in the SRNS relocation, one is a lossy SRNS relocation, and the other is a lossless SRNS relocation.

The lossy SRNS relocation is a method for performing handover as permitting a loss of packet, and is applied to a real time traffic, such as a voice over IP (VoIP) and a streaming service. According to the above method, the PDCP does not receive any acknowledgement (hereinafter, referred to as ACK) for the PDCP PDU transmitted by itself from the RLC, and does not perform a special operation during the SRNS relocation. That is, the PDCP performs the header compression for the PDCP SDU transmitted from the GTP-U and descends to the RLC.

On the contrary, in case of the lossless SRNS relocation (LSR), even a loss of a packet is not permitted, and therefore, the PDCP performs more complex operations than the lossy SRNS relocation. The LSR is mainly applied to a service which does not require the real time traffic (e-mail, FTP, and web browsing, etc.), because most of the data permitting the non-real time traffic have a characteristic that if a part of the data is lost, then entire data is lost. Therefore, in the case that the LSR is used, the SN is used in the PDCP in order to manage the PDCP PDU transmission/receive. In addition, if the SNs of the sender PDCP and of the receiver PDCP are different from each other, a special PDU for notifying the SN, that is, the PDCP SeqNum PDU is used for synchronizing the SNs of both sides. In addition, the RLC uses only the AM among the TM, UM, and AM, and also uses in-sequence delivery method.

The PDCP SN is in the sender and in the receiver, respectively. The send SN is used in the sender, and the receive SN is used in the receiver.

The send SN is increased by 1 whenever one PDCP PDU (same as the RLC SDU) is descended to the RLC from the PDCP, and the receive SN is increased by 1 when a normal PDCP PDU (=RLC SDU) is transmitted from the RLC to the PDCP, or when a signal representing a RLC SDU is discarded is transmitted from the RLC to the PDCP. In addition, when one PDCP SeqNum PDU is transmitted, the send SN is updated as the value notified by the above PDU.

FIG. 9a and FIG. 9b are views showing the process of LSR in case that the UE performs a handover between the RNS suggested in the conventional 3GPP specification. FIG. 9a shows downlink protocol and FIG. 9b shows uplink protocol.

Hereinafter, FIG. 9a will be described using the reference numerals shown in the FIG.

First, step 1 shown in FIG. 9a represents a process of requesting relocation to the PDCP by the source RRC after suspending operations under the PDCP layer when the UE requests the handover to another RNS and the SRNS relocation is needed.

The PDCP which received the relocation request in step 1 notifies the source RRC of a DL (down link) SSN of the PDCP PDU which will be transmitted to the down link (hereinafter, referred to as DL) at next first time, and a UL (uplink) RSN of the PDCP PDU which will be transmitted from the uplink (UL) at next first time. Although the SRNS relocation is occurs concurrently in the downlink and uplink, each link will be separately described for easier understanding.

For example of a downlink, if the sender source PDCP delivered PDU 20 to the RLC, the next DL SSN will be numbered 21 (step 2). The source RRC receives the DL SSN from the PDCP in step 2 and transmits it to the target RRC (step 3).

In step 4, the source PDCP transmits the PDCP SDUs, which are not confirmed by the UE through the RLC among the PDCP SDU transmitted to the UE, to the target PDCP through the GTP-U (the layer supporting the packet data transmission on the U-plane, not shown). If the PDUs are transmitted up to PDU 20 to the UE and the transmission success of the PDUs are confirmed up to PDU 15 at the UE, the SDUs corresponding to the unconfirmed PDU 16~PDU 20 are transmitted to the target PDCP (step 4).

The UE PDCP notifies the UE RRC of the DL RSN of the first PDCP SDU which will be transmitted from the UTRAN to the UE at next time (step 9). An SN of a PDCP SDU has the same meaning as that of PDCP PDU.

In step 10, the UE RRC notifies the RRC in the target RNC of the DL RSN. The target RRC compares the DL RSN transmitted from the UE to the DL SSN transmitted from the source RRC to decide the first DL PDCP SN of the PDCP SDU which will be transmitted to the UE at next time.

If the DL RSN is larger than the DL SSN, the DL RSN is regarded as invalid (since received sequence number cannot be larger than the send sequence number), and the target RRC commands to start the SN synchronization process to the PDCP. DL RSN≦DL SSN is a normal case, and then, the First DL PDCP SN will be DL RSN (step 11).

The target RRC notifies the target PDCP of the First DL PDCP SN (DL RSN) which will be transmitted to the DL first. After that, when the transmission is restarted, the target PDCP transmits the SDU corresponding to the First DL PDCP SN (DL RSN) to the DL (step 12).

Referring to FIG. 9*b*, for example of uplink, if the receiver source PDCP received PDU with sequence number 50 from the RLC, next UL RSN will be numbered 51 (step 2).

The source RRC receives the UL RSN from the PDCP in step 2 and transmits it to the target RRC (step 3). The target RRC or the source RRC notifies the UE RRC of the UL RSN.

The UE RRC notifies the UE PDCP of the UL RSN received from the target RRC or the source RRC, after suspending the operation of the RLC. The UE PDCP then transmits the SDU corresponding to the UL RSN to the UL when the transmission is restarted next time (step 8).

However, according to the conventional PDCP protocol specification for performing the lossless SRNS relocation, it is not defined how to manage a PDCP buffer which is needed to transmit the unconfirmed PDCP SDU when the lossless SRNS relocation process is performed. Also, not defined is how to process a gap generated on the PDCP SN after the LSR by the header compression context state.

Also, not defined is how to do if the SNs between the PDCPs are different from each other, how to decide the PDCP SDU data transmission point, and how to operate the PDCP receiver after the LSR process.

Moreover, a problem of modular comparison which is generated when the target RRC compares the SN can not be solved yet.

Therefore, if the PDCP is operated according to the conventional art suggested in the PDCP protocol specification for supporting the LSR, the SRNS cannot be relocated without a loss. Accordingly, the lossless transmission/reception of the packet data in a mobile environment can not be made.

SUMMARY OF THE INVENTION

Therefore, an object of the present invention is to provide a new PDCP structure having a PDCP SDU buffer so that the PDCP is able to operate stably when the PDCP performs LSR operation, an effective procedure based on the PDCP structure, and a primitive and parameters needed.

Also, another object of the present invention is to provide an effective LSR method avoiding any loss on packet data by defining an interface protocol in a radio network controller or a user equipment.

To achieve these and other advantages and in accordance with the purpose of the present invention, as embodied and broadly described herein, there is provided a method for transmitting packet data in a radio network having at least a sender PDCP layer checking the validity of the next expected receive PDCP sequence number sent from a receiver PDCP layer with the send PDCP sequence number of first transmitted but not yet acknowledged PDCP SDU and the send PDCP sequence number first unsent PDCP SDU of the sender PDCP layer.

According to one aspect of the present invention, there is provided a method for transmitting packet data in a radio network having at least a source radio network controller (RNC) and a target RNC, each RNC including at least lower and upper layer protocols, wherein the upper layer protocol is set on top of the lower layer protocol, the source and the target RNCs being in data communication with a user equipment having lower and upper layers, when a SRNS relocation occurs, the method comprising the steps of: the source RNC forwarding a send sequence number to the target RNC; the source RNC forwarding unconfirmed data units and corresponding sequence numbers to the target RNC; the target RNC receiving a receive sequence number from the user equipment; and the target RNC determining whether the receive sequence number is in a valid range by using at least a first unconfirmed data unit sequence number received from the source RNC.

According to another aspect of the present invention, the send sequence number of the source RNC is provided to the upper layer protocol of the target RNC from the upper layer protocol of the source RNC.

According to another aspect of the present invention, the unconfirmed data units and the corresponding sequence numbers are provided to the lower layer protocol of the target RNC from the lower layer protocol of the source RNC.

According to another aspect of the present invention, the receive sequence number is provided to the upper layer protocol of the target RNC from the upper layer protocol of the user equipment.

Preferably, the upper and the lower layer protocols of the source RNC are radio resource control layer and packet data convergence protocol layer, respectively. The upper and the lower layer protocols of the target RNC are radio resource control layer and packet data convergence protocol layer, respectively. Similarly, the upper and the lower layer protocols of the user equipment are preferably radio resource control layer and packet data convergence protocol layer, respectively.

According to one aspect of the present invention, the lower layer protocol of the target RNC determines whether the receive sequence number is in a valid range by at least using a first unconfirmed data unit sequence number received from the source RNC. Alternatively, the upper layer protocol of the target RNC may determine whether the receive sequence number is in a valid range by at least using a first unconfirmed data unit sequence number received from the source RNC. Preferably, the receive sequence number is in an invalid range if the receive sequence number is less than the first unconfirmed data unit sequence number or is greater than send sequence number.

According to one aspect of the present invention, if the receive sequence number is in the invalid range then initiating a sequence number synchronization. Preferably, the sequence number synchronization is initiated by the lower layer protocol of the target RNC. The lower layer protocol of the target RNC is a packet data convergence protocol layer. Also, the sequence number synchronization is preferably initiated by the upper layer protocol of the target RNC. The upper layer protocol of the target RNC is a radio resource control layer.

According to one embodiment of the present invention, a method for delivering packet data in a radio network having at least a source radio network controller (RNC) and a target RNC and operable with a user equipment which is receiving at least part of the packet data from the source RNC and is receiving other part of the packet data from the target RNC, each RNC including at least lower and upper layer protocols, wherein the target RNC having at least a receive sequence number from the user equipment and a first unconfirmed data unit sequence number from the source RNC and a send sequence number corresponding to a first unsent data unit, the method comprising the steps of: the source RNC forwarding unconfirmed data units to the target RNC so that at least part of the unconfirmed data units is forwarded to the user equipment; and the target RNC determining whether the receive sequence number is in a valid range by at least using the first unconfirmed data unit sequence number, wherein the receive sequence number is in an invalid range if the receive sequence number is less than the first unconfirmed data unit sequence number or is greater than the send sequence number. The upper and the lower layer protocols of the source RNC are radio resource control layer and packet data convergence protocol layer, respectively. The upper and the lower layer protocols of the target RNC are radio resource control layer and packet data convergence protocol layer, respectively.

According to one aspect of the present invention, the source RNC forwarding sequence numbers corresponds to the unconfirmed data units to the target RNC.

According to another aspect of the present invention, the user equipment includes at least lower and upper layer protocols. Preferably, the unconfirmed data units and the corresponding sequence numbers are provided to the lower layer protocol of the target RNC from the lower layer protocol of the source RNC. Similarly, the receive sequence number is provided to the upper layer protocol of the target RNC from the upper layer protocol of the user equipment. The upper and the lower layer protocols of the user equipment are radio resource control layer and packet data convergence protocol layer, respectively.

According to another aspect of the present invention, the lower layer protocol of the target RNC determines whether the receive sequence number is in a valid range by at least using the first unconfirmed data unit sequence number received from the source RNC. Alternatively, the upper layer protocol of the target RNC determines whether the receive sequence number is in a valid range by at least using the first unconfirmed data unit sequence number received from the source RNC. If the receive sequence number is in the invalid range then the lower layer protocol initiates a sequence number synchronization. Preferably, the lower layer protocol of the target RNC is a packet data convergence protocol layer.

The uplink process for the lossless packet data transmission is provides as a method for delivering packet data in a radio network having at least a source radio network controller (RNC) and a target RNC and operable with a user equipment which is transmitting at least part of the packet data to the source RNC and is transmitting other part of the packet data to the target RNC, each RNC including at least lower and upper layer protocols, the method comprising the steps of: the target RNC receiving at least a receive sequence number from the source RNC; the target RNC providing the receive sequence number to the user equipment; and the user equipment determining whether the receive sequence number is in a valid range by at least using a first unconfirmed data unit sequence number, wherein the receive sequence number is in an invalid range if the receive sequence number is less than the first unconfirmed data unit sequence number or is greater than the send sequence number.

To perform the above described processes, a packet data transfer system in a radio network for use with a user equipment that provides a receive sequence number corresponding to a next expected sequence number of a data unit, comprises: a target radio network controller (RNC) having lower and upper layer protocols and receiving the receive sequence number from the user equipment; a source RNC having lower and upper layer protocols, wherein the source RNC provides to the target RNC a first unconfirmed data unit sequence number, wherein the target RNC determines whether the receive sequence number is in a valid range by at least using the first unconfirmed data unit sequence number, wherein the receive sequence number is in an invalid range if the receive sequence number is less than the first unconfirmed data unit sequence number or is greater than a send sequence number that corresponds to a first unsent sequence number.

According to one aspect of the present invention, the source RNC forwards unconfirmed data units to the target RNC. In addition, the upper and the lower layer protocols of the source RNC are radio resource control layer and packet data convergence protocol layer, respectively. The upper and the lower layer protocols of the target RNC are radio resource control layer and packet data convergence protocol layer, respectively.

According to another aspect of the present invention, the lower layer protocol of the target RNC determines whether the receive sequence number is in a valid range by at least using the first unconfirmed data unit sequence number received from the source RNC. Preferably, the upper layer protocol of the target RNC determines whether the receive sequence number is in a valid range by at least using the first unconfirmed data unit sequence number received from the source RNC. If the receive sequence number is in the invalid range then the lower layer protocol of the target RNC initiates a sequence number synchronization.

A user equipment for use in a radio network to uplink packet data at least initially to a source radio network controller (RNC) and then to a target RNC, comprises: an upper layer protocol that receives a receive sequence number from the target RNC, the receive sequence number corresponding to a next expected sequence number; and a lower layer protocol in communication with the upper layer protocol, receiving the receive sequence number therefrom, wherein the lower layer protocol determining whether the receive sequence number is in a valid range, and wherein the receive sequence number is in an invalid range if the receive sequence number is less than a first unconfirmed data unit sequence number or is greater than a send sequence number, the send sequence number corresponding to a first unsent data unit sequence number and the first unconfirmed data unit sequence number corresponds to a sequence number of first transmitted but not yet acknowledged data unit.

According to one aspect of the present invention, the upper and the lower layer protocols of the user equipment are radio resource control layer and packet data convergence protocol layer, respectively. If the receive sequence number is in the invalid range, then the lower layer protocol of the user equipment initiates a sequence number synchronization.

In a method for transmitting packet data in a radio network having at least a sender PDCP layer and a receiver side, the steps comprises transmitting a data unit having a sequence number to a receiver side; receiving a receive sequence number sent from the receiver side; checking whether the receive sequence number is in a range between a send sequence number of first transmitted but not yet acknowledged data unit and a send sequence number of first unsent data unit of the sender PDCP layer; and initiating a sequence number synchronization, if the receive sequence number is not in the range.9. The range preferably is from the first unconfirmed data unit sequence number and to the send sequence number.

The radio network preferably has at least a source radio network controller (RNC) and a target RNC, each RNC comprising at least a PDCP layer as a sender PDCP layer, the source and the target RNCs being in data communication with a user equipment as the receiver side, and the source RNC forwarding a send sequence number to the target RNC; the source RNC forwarding unconfirmed data units and corresponding sequence numbers to the target RNC.

According to one aspect of the present invention, the send sequence number of the source RNC is provided through RRC layers of the source and target RNCs. Also, the unconfirmed data units and the corresponding sequence numbers are provided through GTP layers of the source and target RNCs. Preferably, the receive sequence number received by the source RNC is provided through RRC layers of the source and target RNCs. Alternatively, the receive sequence number may be provided from an RRC layer of the receiver side. Further alternatively, the receive sequence number may be provided from the PDCP layer to the RRC layer of the receiver side.

According to another aspect of the present invention, the receive sequence number is the sequence number of the receiver side expected to be received next time.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 8 illustrates different PDCP PDU types;

DETAILED DESCRIPTION OF THE PREFERRED EMBODIMENTS

Reference will now be made in detail to the preferred embodiments of the present invention, examples of which are illustrated in the accompanying drawings.

Hereinafter, a new PDCP structure according to a preferred embodiment of the present invention and a method for offering packet data lossless according to a handover according to the preferred embodiment of the present invention will be described as follows with reference to accompanying figures.

Some parts of the conventional art will be described in order to clarify the differences between the present invention and the conventional art.

Figure 10:
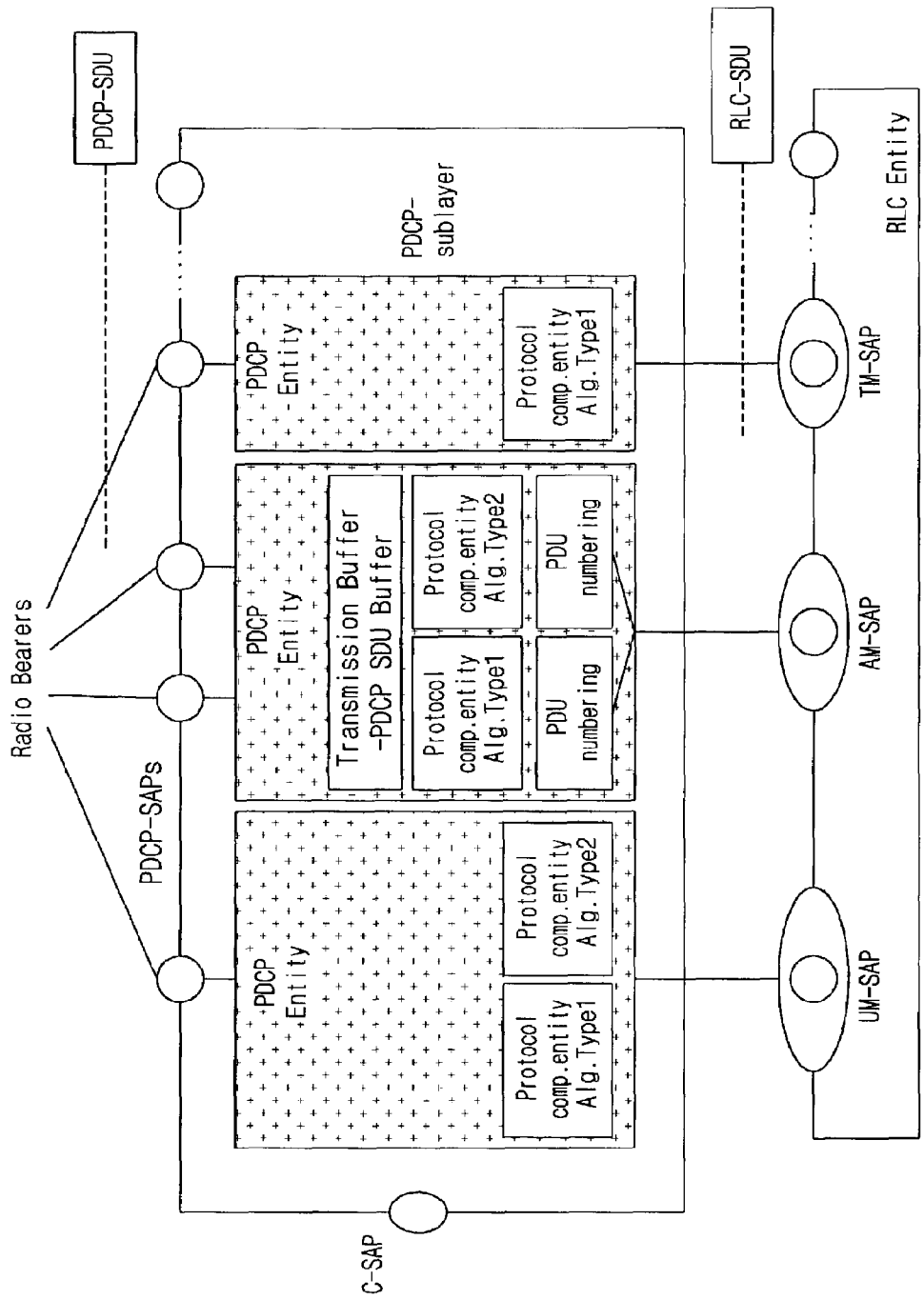
FIG. 10 illustrates PDCP structure including an SDU buffer on a sender of PDCP layer according to a preferred embodiment of the present invention.

FIG. 10 is a view showing a new PDCP structure including an SDU buffer on a sender on a PDCP layer. The PDCP SDU buffer may be needed when the PDCP needs to support a lossless SRNS relocation (LSR).

The PDCP SDU buffer is preferably used instead of the PDCP PDU buffer. If the LSR is generated, a header compression algorithm is newly assigned, and therefore, the algorithms used in a source PDCP and used in a target PDCP are differentiated from each other. Therefore, the PDCP PDUs which were compressed using the algorithm before the LSR is performed cannot be decompressed after the LSR process is ended.

That is, the PDCP SDUs are stored in the buffer, and then are forwarded to the target PDCP in the state that the SDUs are not compressed when the LSR is generated. And the target PDCP compresses and transmits the forwarded SDUs using the newly assigned header compression algorithm.

As shown in FIG. 10, in case that the PDCP supports the LSR, when the PDCP receives the SDUs, the PDCP stores the SDUs in the buffer as respective SDU unit form, after that, the PDCP performs the header compression according to the provided header compression algorithm to generate the PDCP PDUs (=RLC SDUs), and descends the PDCP PDUs to an RLC AM entity.

On the other hand, the sender of the UTRAN PDCP should manage the PDCP SNs.

Figure 11A:
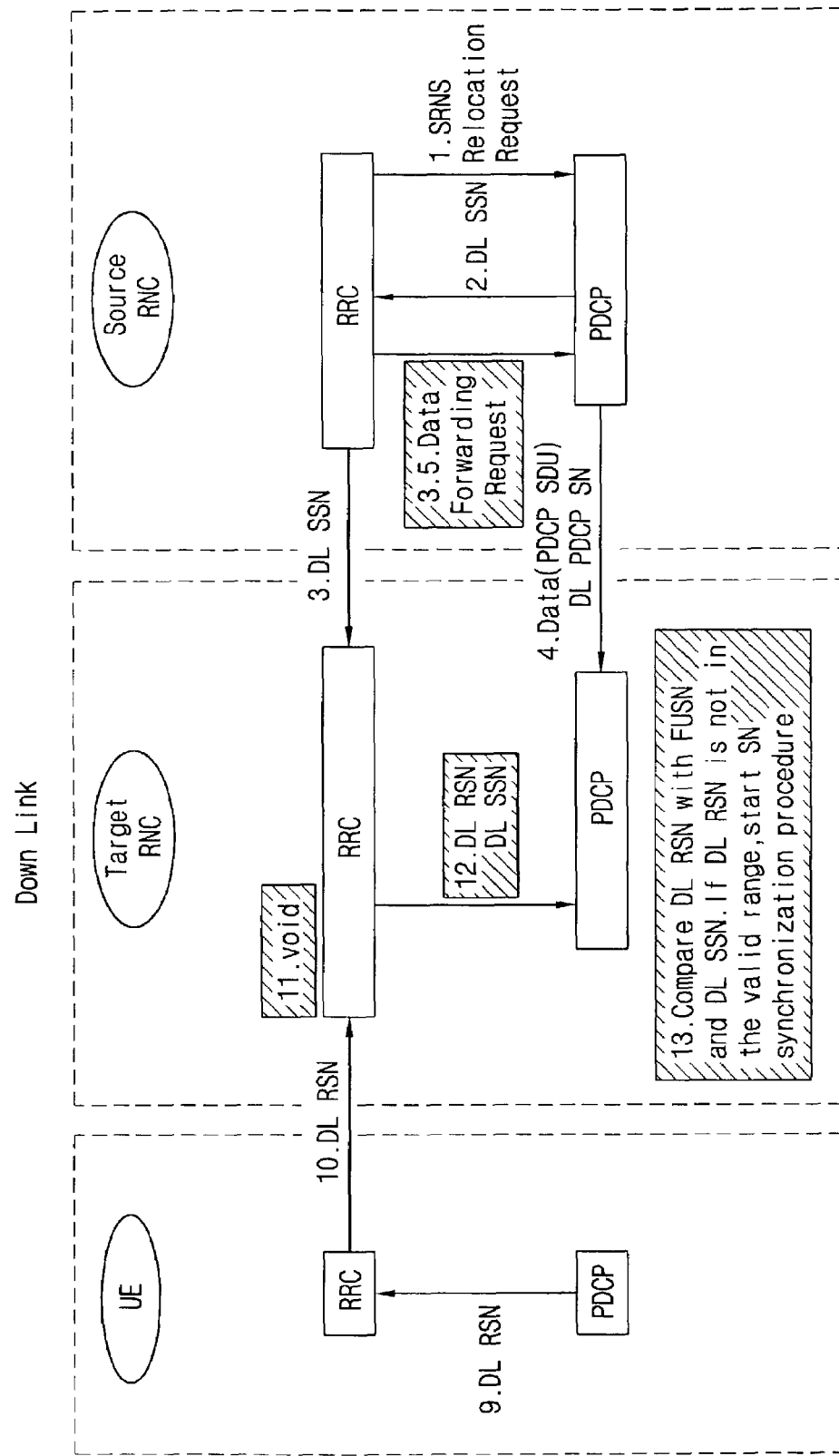
FIGS. 11a and 11b are flow charts showing LSR process in case that the UE performs handover between the RNSs according to an embodiment of the present invention.
Figure 11B:
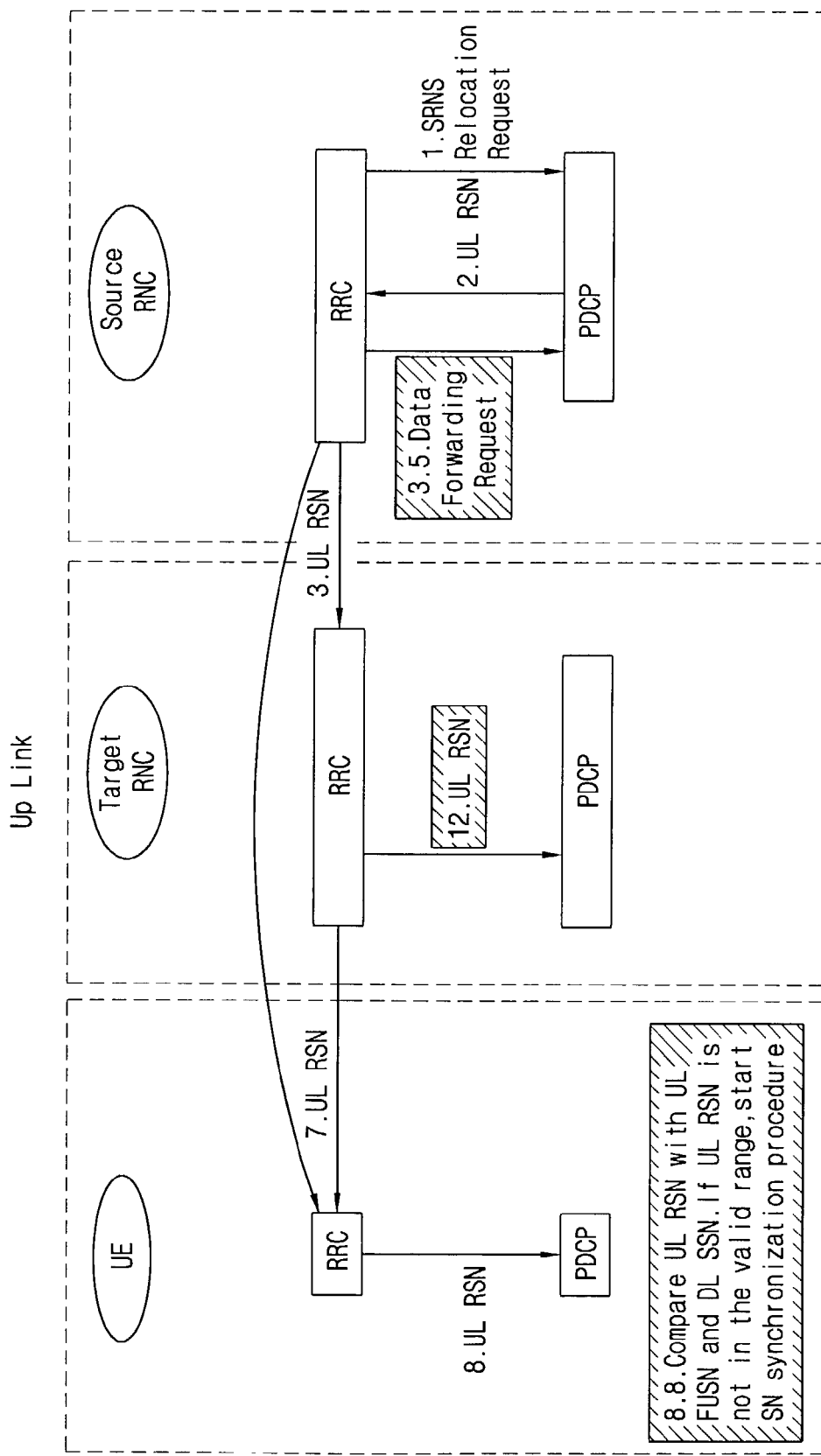

FIGS. 11a and 11b illustrate an LSR process when the UE performs a handover between the RNSs according to the preferred embodiment of the present invention. In particular, FIG. 11a illustrates a downlink of an LSR process (i.e., from UTRAN to UE), and FIG. 11b illustrates an uplink (i.e., from UE to UTRAN).

Figure 1:
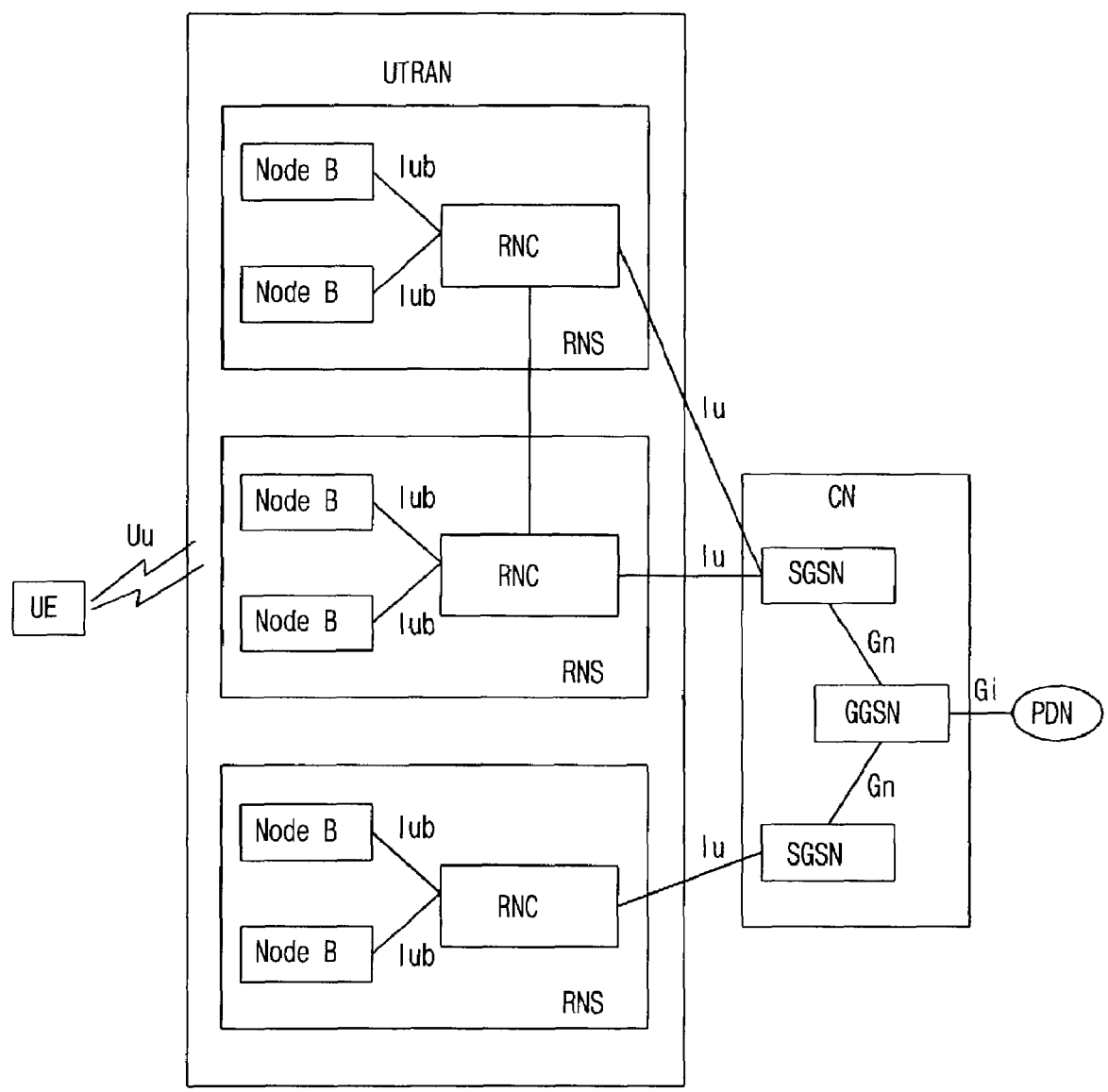
FIG. 1 is a view showing a network structure in a packet service domain among network structures suggested by TSG-RAN and TSG-CN.
Figure 2:
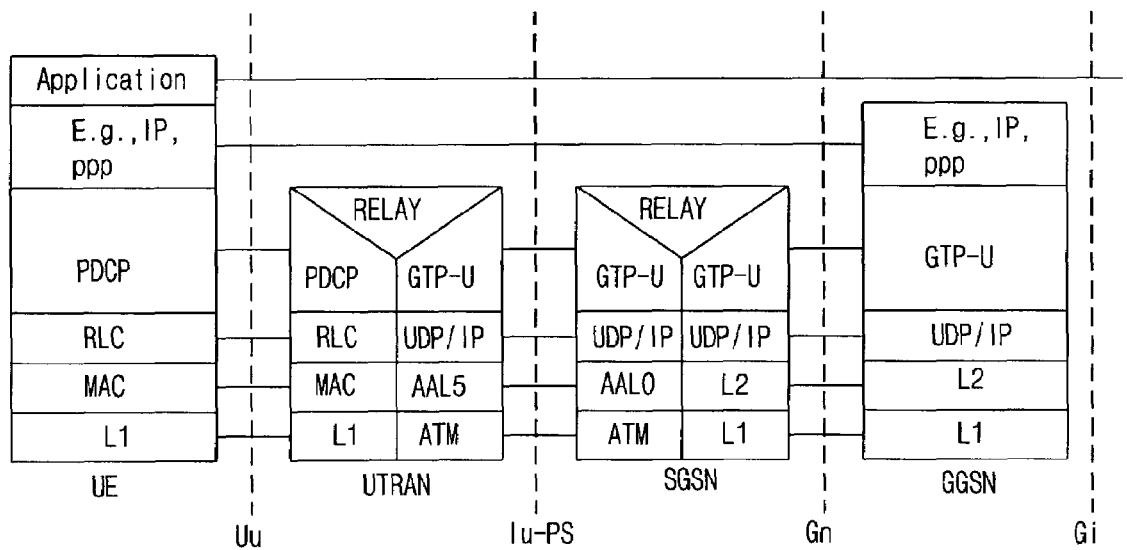
FIG. 2 is a view showing a user plane (U-plane) layered structure for transmitting user data.
Figure 3:
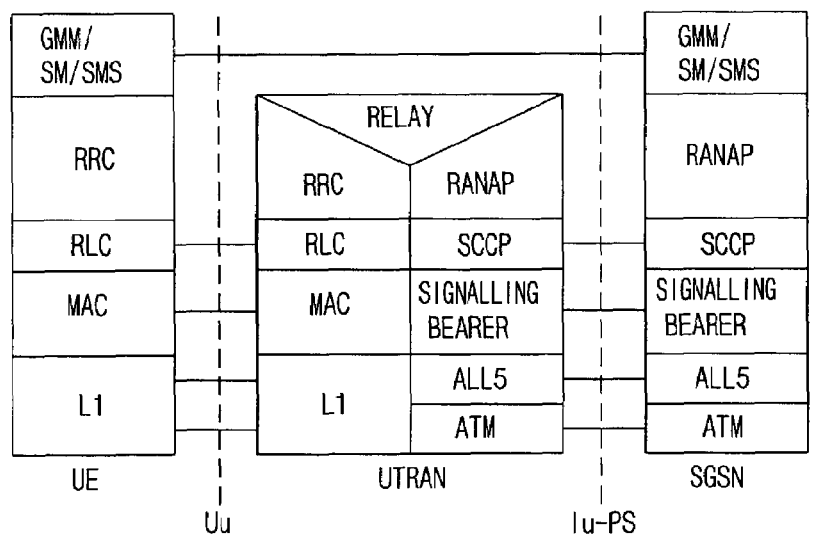
FIG. 3 is a view showing a control plane (C-plane) layered structure for transmitting a control signal.
Figure 4:
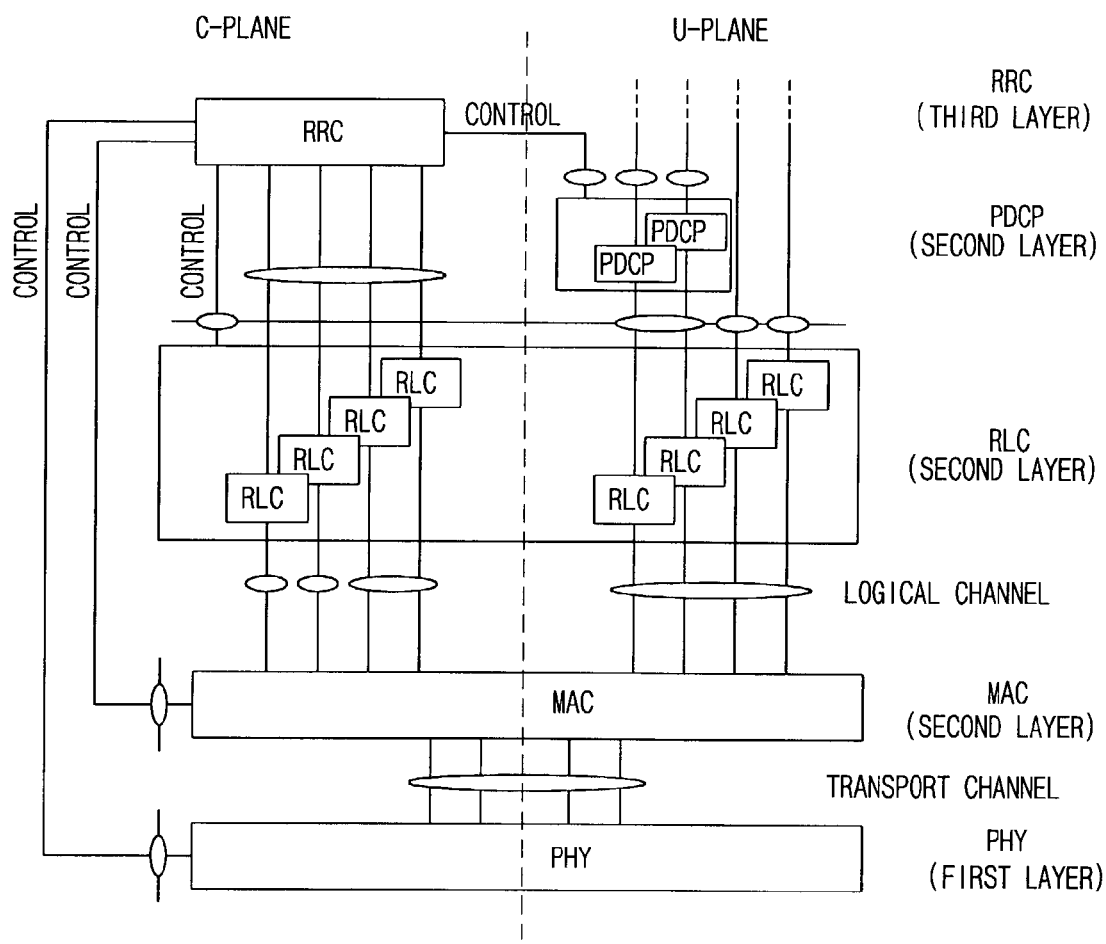
FIG. 4 is a view showing detailed layers of the Uu interface, which is a radio section, among the layers shown in FIGS. 2 and 3.
Figure 5:
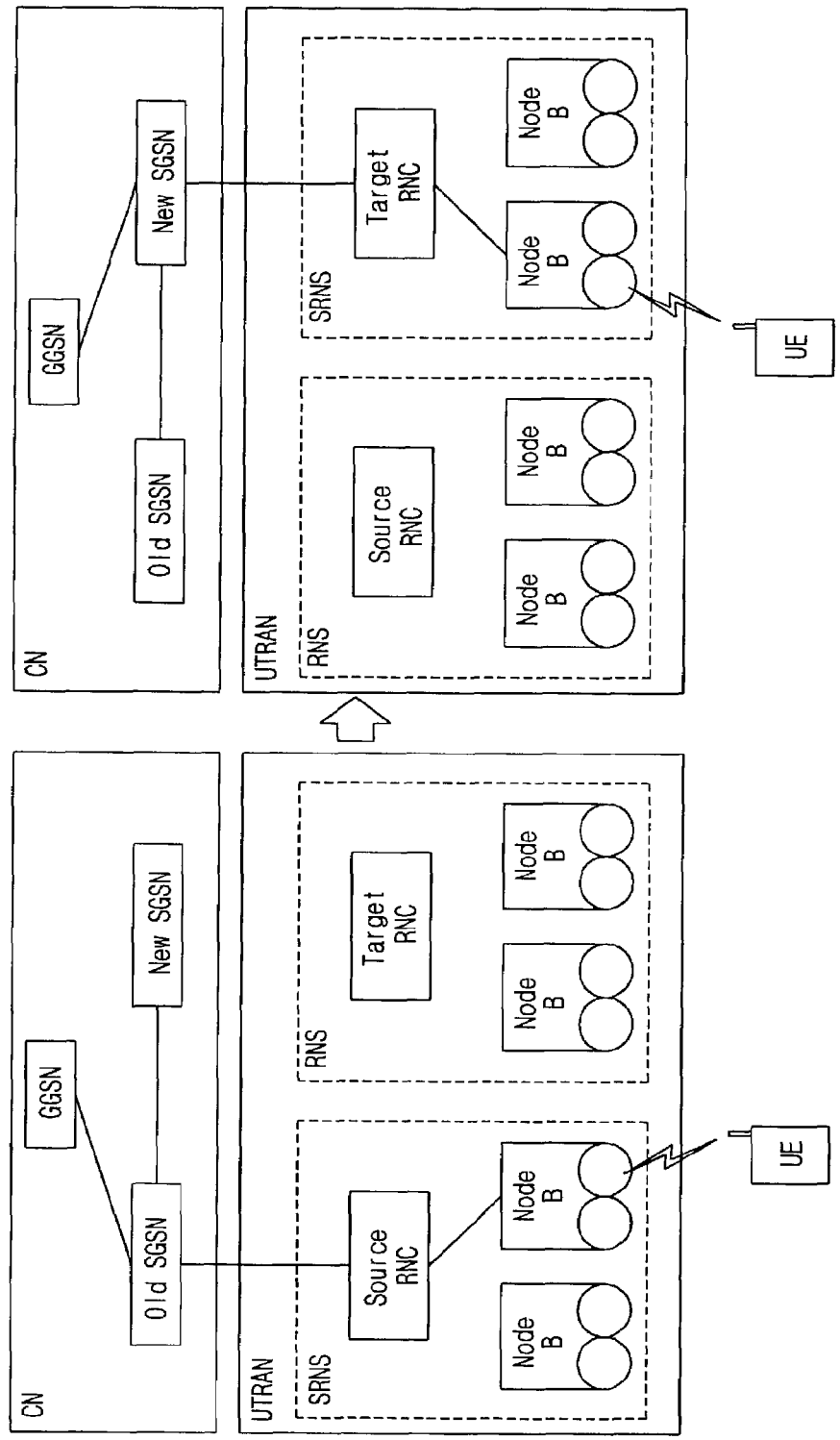
FIG. 5 illustrates a conventional SRNS relocation process.
Figure 6:
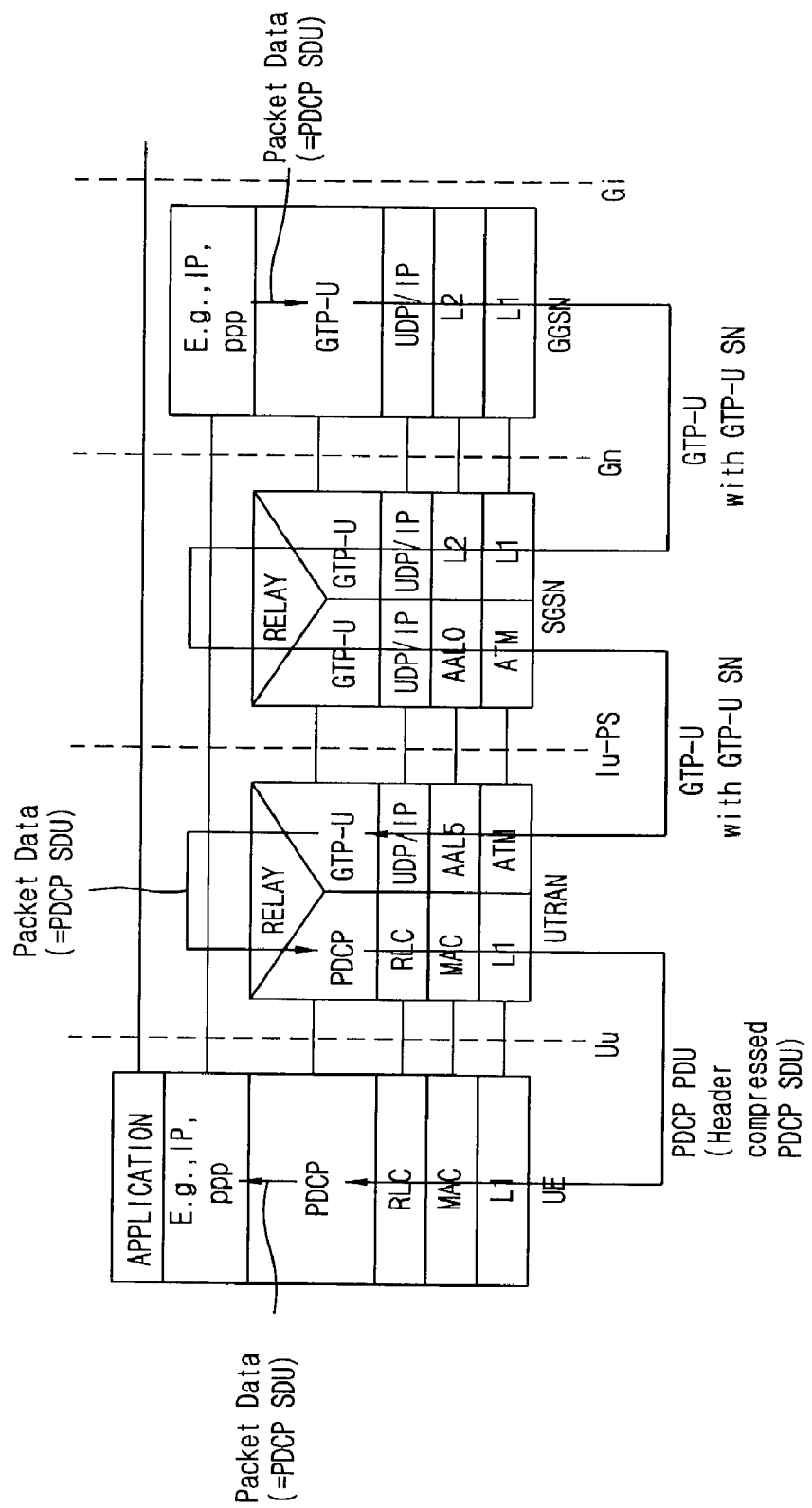
FIG. 6 is a view showing a packet data flowing on the U-plane according to the conventional art.
Figure 7:
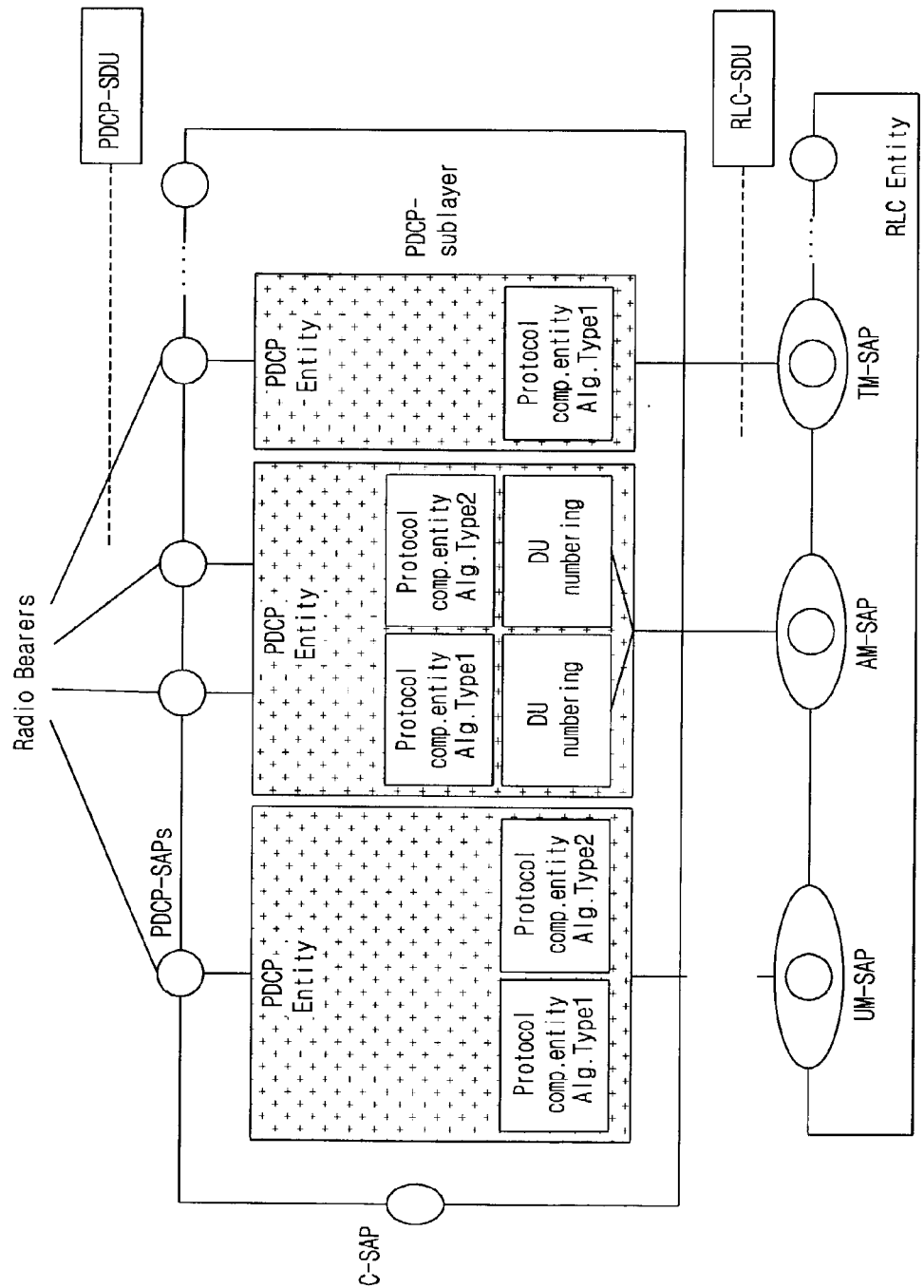
FIG. 7 is a view showing a PDCP structure, which is a layer for transmitting/receiving packet data in the radio section, among the layers related to the flowing of the packet data.
Figure 9A:
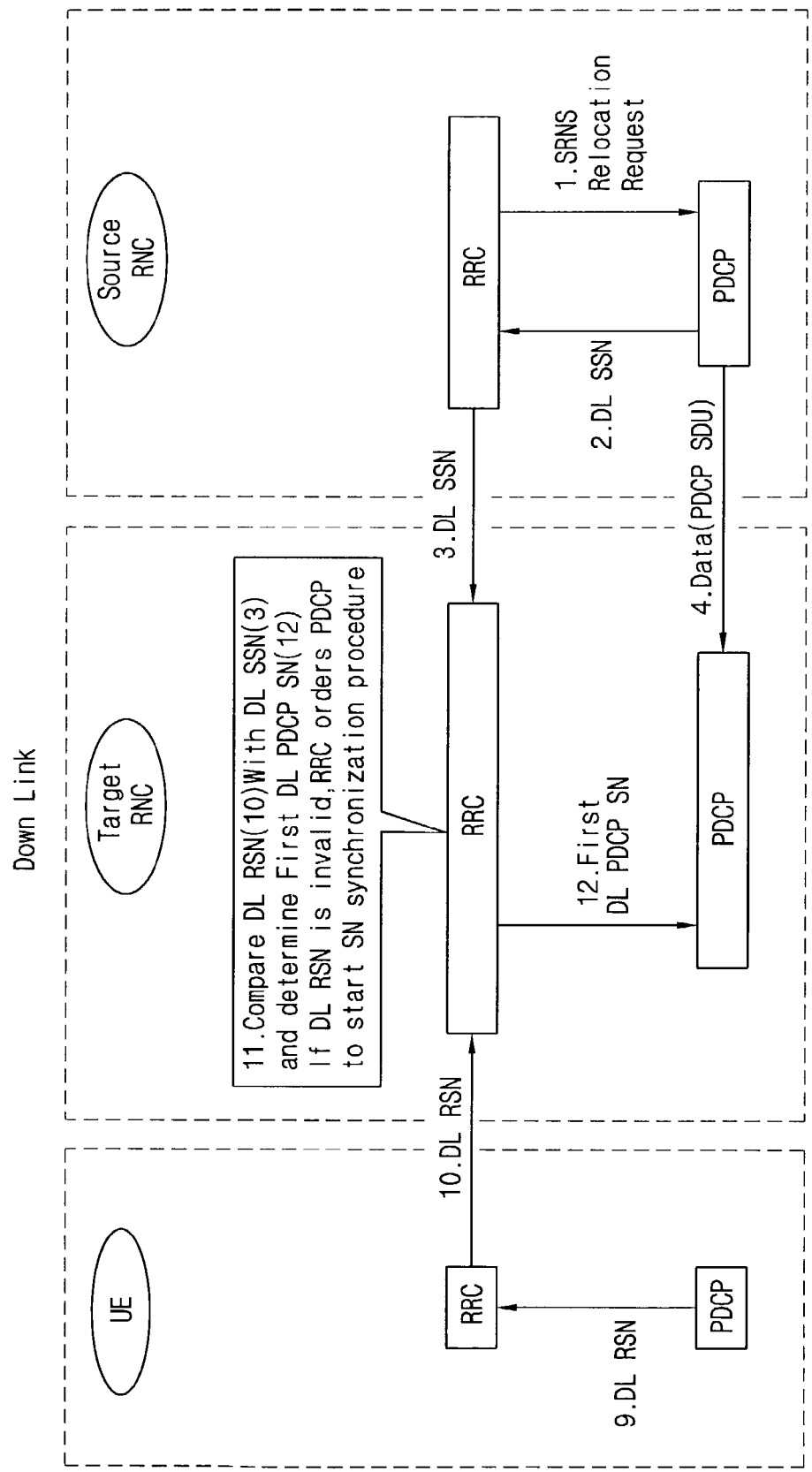
FIGS. 9a and 9b are flow charts showing a lossless SRNS relocation (LSR) process in case that user equipment (UE) performs handover between RNSs shown in the conventional 3GPP standard specification.
Figure 9B:
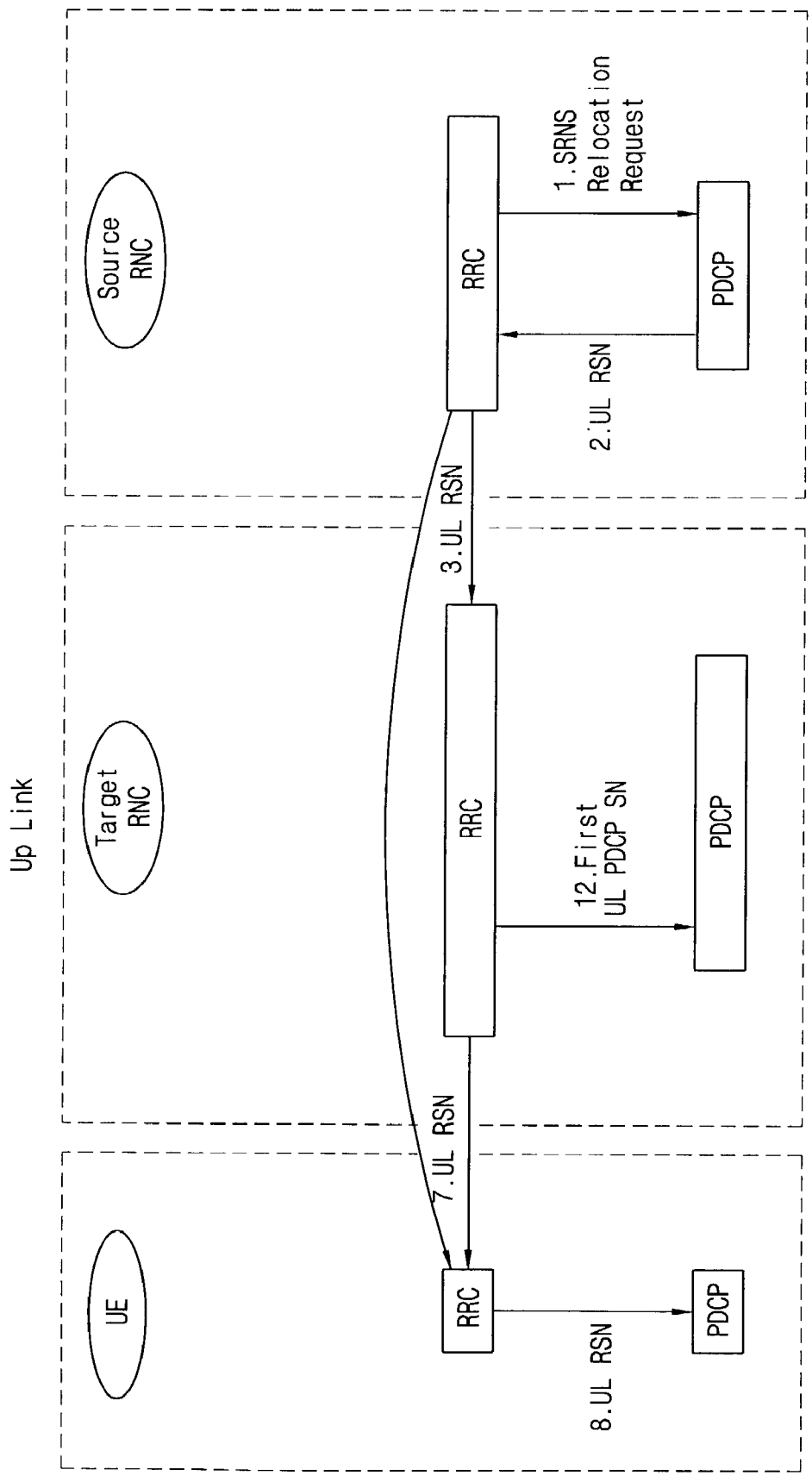

Referring to FIGS. 11a and 11b, the same reference numerals are used for the same operations as those of the conventional art shown in FIGS. 9a and 9b, and a newly added or amended process or step is presented with a decimal point (that is, if a process is added between process 3 and process 4, it can be represented as 3.5). In addition, the descriptions in the shaded boxes represent the amended or newly added processes.

Referring to FIG. 11a, in a downlink mode, when the LSR is generated or activated, DL PDCP SN is transmitted to the GTP-U with unconfirmed PDCP SDU. It is because that DL GTP-U SN and DL PDCP SN as well as the data (PDCP SDU) are also forwarded to the target GTP-U from the source GTP-U when the unconfirmed SDU is forwarded from the source GTP-U to the target GTP-U, and the unconfirmed SDU and respective DL PDCP SNs are managed by the PDCP, and thereby the GTP-U can not know the DL PDCP SN. Preferably, PDCP SDU and DL PDCP SN are forwarded to the target PDCP by bypassing the source and target GTP-Us, as shown in FIG. 11a.

Therefore, when the LSR is activated and the data is forwarded, the DL PDCP SN is also forwarded with the data from the PDCP of the source RNC to the PDCP of the target RNC.

Preferably, the source RNC adds the DL PDCP SN as well as the PDCP SDU to a PDCP-DATA-Indication primitive which is forwarded from the PDCP of the source RNC to the GTP-U, and the target RNC adds the DL PDCP SN as well as the PDCP SDU to a PDCP-DATA-Request primitive which is forwarded to the PDCP. The above method is used on the UTRAN side when the LSR is supported, and shown as step 4 in FIG. 11a.

As described above, in order to forward the unconfirmed SDU, the source RRC should command the source PDCP to initiate. In other words, the data forwarding request should be provided to the source PDCP as shown in step 3.5.

The PDCP cannot initiate the data forwarding by itself, and is required a command from the RRC. However, the command is not defined in the conventional telecommunication standard. Therefore, the source PDCP cannot forward the data during the LSR is operated.

As a result, unconfirmed SDUs are all discarded. In order to solve the above problem, the source RRC commands the source PDCP by sending a data forwarding request as shown in step 3.5 of FIG. 11a according to an embodiment of the present invention.

On the other hand, the target PDCP receives the DL PDCP SN from the target RRC during the LSR process. As a result, the PDCP knows the SN of the PDU which will be transmitted to the UE first.

However, the above description is for the sender of the target PDCP, and the receiver should know a first UL PDCP SN which should be transmitted first from the UE.

Referring to FIG. 9b, if the receiver of the target PDCP does not receive the first UL PDCP SN from the target RRC, the SN of the PDU which received first by the PDCP after the LSR process will be 0, and the SNs are not synchronized in the PDCP data transmission of UL.

Therefore, the receiver of the target PDCP must receive the first UL PDCP SN from the target RRC. In that regard, the target RRC notifies the target PDCP of the first DL PDCP SN in the conventional telecommunication standard.

In order to solve the above problem, the present invention suggests a method wherein the target RRC notifies the target PDCP with the first DL PDCP SN (e.g., DL RSN) and the first UL PDCP SN (e.g., UL RSN) as shown in step 12 of FIG. 11a.

Also, in the present 3GPP standard specification, if the SNs of the PDCPs on sender and on the receiver are different from each other, the SN synchronization process is performed in order to coincide or correct the SNs.

However, the SN synchronization process can be only performed when the RRC commands the PDCP, and the PDCP is not able to start the SN synchronization process of itself.

The general SN synchronization process will be described as follows. When the RRC recognizes that the SN of the sender PDCP thereof and the SN of the receiver PDCP on the counterpart are different from each other, the RRC commands the sender PDCP to perform the SN synchronization process.

The PDCP of the source RNC which received the above command transmits the PDCP SeqNum PDU to the PDCP of the target RNC. The PDCP SeqNum PDU is in a special PDU (namely, PDCP SeqNum PDU in FIG. 8) instead of the PDCP data PDU, for notifying the SN, and a send sequence number (SSN) is added to the PDCP SeqNum PDU.

The receiver PDCP (or the PDCP of the target RNC) which receives the PDCP SeqNum PDU sets a receive sequence number (RSN) to the SSN of SeqNum PDU to match the SNs of both sides (SSN and RSN).

In addition, the PDCP sender ends the SN synchronization process on receiving the identification representing that the receiver receives even one of the PDCP SeqNum PDUs, and transmits data afterwards using PDCP data PDU.

There are three cases that require the SN synchronization process in the conventional specification.

First, after RLC reset;

Second, after a radio bearer reconfiguration process; and

Third, in case that the target RRC receives an invalid DL RSN from the UE RRC during LSR.

The RLC reset or the RB reconfiguration may be generated before the PDCP PDU which is descended from the sender PDCP to the RLC is transmitted to the receiver, and in that case, the SSN is increased and the RSN is not increased. Therefore, after the above processes, the SN synchronization process is required.

The third case is needed in following case. The target RRC decides the first DL PDCP SN of the PDCP PDU which will be transmitted first at the next time by comparing the DL SSN received from the source RRC and the DL RSN received from the UE RRC during the LSR process (step 11 in FIG. 9a).

Generally, the DL RSN is DL SSN or less by the unconfirmed SDU, then, the first PDCP SN is set as DL RSN and notified to the PDCP.

However, if the DL RSN received from the UE is larger than the DL SSN because of as an error during the transmission, or an error in the protocol, the DL RSN is invalid. In such a case, the RRC recognizes that there is an error in the US RSN, and commands the PDCP to start the SN synchronization process.

In the conventional 3GPP specification (and also shown in step 11 of FIG. 9a), it is defined that the RRC commands the PDCP sender to start the SN synchronization process for the above three cases.

However, in the third case, if the target RRC receives the invalid DL RSN from the UE RRC during the LSR process, a serious error may be generated. For example, 16 bits are used in the PDCP SN, and the ranges 0 through 65535 are represented with the 16 bits. Therefore, a next SN beyond SN=65535 will be looped around to 0. Thereafter, the SN is successively incremented from 0.

For example, in case that the SNs of the unconfirmed SDUs are 65000~2000 (that is, 65000~65535, 0~2000), when the target RRC receives the DL RSN=65535 from the UE, the target RRC regards the DL RSN as invalid because the DL SSN=2001 (that is, DL RSN>DL SSN). And accordingly, the target RRC commands the target PDCP to start the SN synchronization process.

In above case, although the UE receives the SDUs corresponding to SN=65000~65334 correctly, the PDCP re-transmits the SDU from SN=65000 using the SeqNum PDU, and thereby, wasting radio resources.

The above problem is generated because the target RRC does not know a valid range of the DL RSN. In addition, modular comparison problem is generated in the above case.

Therefore, in order to solve the above problems, the present invention suggests following method.

The method suggested by the present invention will be described with reference to FIGS. 11a and 11b.

In order to test the validity of the DL RSN received from the UE, the DL SSN received from the source RRC and the first unconfirmed SN of SDU (FUSN). FUSN is equivalent to the transmitted but not yet acknowledged SDU.

The FUSN and the DL SSN are values deciding the validity range of the DL RSN. If the FUSN≦DL RSN≦DL SSN, the DL RSN value is deemed valid and the SDU corresponding to the DL RSN is transmitted, for example, to UE. If the DL RSN is located out of the above range, it is deemed that the DL RSN is invalid and the SN synchronization process is initiated.

The validity test for the DL RSN is preferably performed either by the RRC or the PDCP. The validity test for the DL RSN being performed in the PDCP according to one embodiment of the present invention will be described with reference to FIG. 11a (step 13).

When the target RRC receives the DL RSN from the UE RRC (step 10 in FIG. 11a), the target RRC notifies the target PDCP of the DL RSN with the DL SSN received from the source RRC (step 12 in FIG. 11a).

The target RRC also notifies the PDCP of the UL RSN for the receiver of PDCP. And it is important that the DL SSN is also notified.

In a normal case, the PDCP knows the DL send PDCP SN of the respective unconfirmed SDU, and the DL SSN is the value adding 1 to last unconfirmed SN of SDU (LUSN), and therefore, the DL SSN may not be notified. However, in case that a gap SN, which will be described below, is generated, the formula DL SSN=LUSN+1 is not true, and therefore, the DL SSN is also notified in anticipation of such problem.

The DL RSN is inspected in the RRC in the conventional art (step 11 in FIG. 9a). However, the DL RSN is preferably inspected by the PDCP in the preferred embodiment of the present invention, and the RRC forwards preferably three values (DL RSN, DL SSN, and UL RSN) to the PDCP.

Therefore, in this embodiment, no action is taking place in the target RRC as shown in step 11 in FIG. 11a.

The target PDCP which received the DL RSN and the DL SSN from the target RRC tests whether the condition of FUSN≦DL RSN≦DL SSN is satisfied using the FUSN stored therein. If the condition is satisfied, the PDCP of the target RNC starts the transmission of the SDU having the sequence number corresponding to the DL RSN. If the condition is not satisfied, the PDCP of the target RNC starts the SN synchronization process and starts the transmission of the SDU having the sequence number corresponding to the FUSN using the PDCP SeqNum PDU.

According to the preferred embodiment, the SN synchronization process is initiated pursuant to the decision of the PDCP on its own, rather than in response to the command from the RRC as in the conventional art.

Also, initiating the SN validity test and the SN synchronization process may be performed by the UE as well as by the UTRAN.

FIG. 11b illustrates an uplink LSR process according to the preferred embodiment.

In the conventional art, when the PDCP of the UE receives the UL RSN, the PDCP starts the transmission from the SDU corresponding to the UL RSN without any inspection. In addition, there is no definition for a case that the UL RSN is out of the valid range in the conventional specification.

According to the preferred embodiment, when the target RRC receives the US RSN from the source RRC (step 3 in FIG. 11b), the target RRC notifies the target PDCP of the UL RSN (step 12 in FIG. 11b). In addition, the target RRC forwards UL RSN to UE RRC (step 7) which is then forwarded to the UE PDCP (step 8).

In this embodiment, the UE PDCP performs the validity test for the UL RSN during the uplink mode as in the UTRAN PDCP. In addition, if the UL RSN is out of the valid range, the SN synchronization process is started. And the validity test in the UE PDCP is made by identifying whether or not the UL RSN received from the RRC satisfies the condition of FUSN≦UL RSN≦UL SSN.

If the condition is satisfied, the transmission is started from the SDU corresponding to the UL RSN. In addition, if the condition is not satisfied, the SN synchronization process is started and the transmission is started from the SDU corresponding to the FUSN using the SeqNum PDU.

Figure 12:
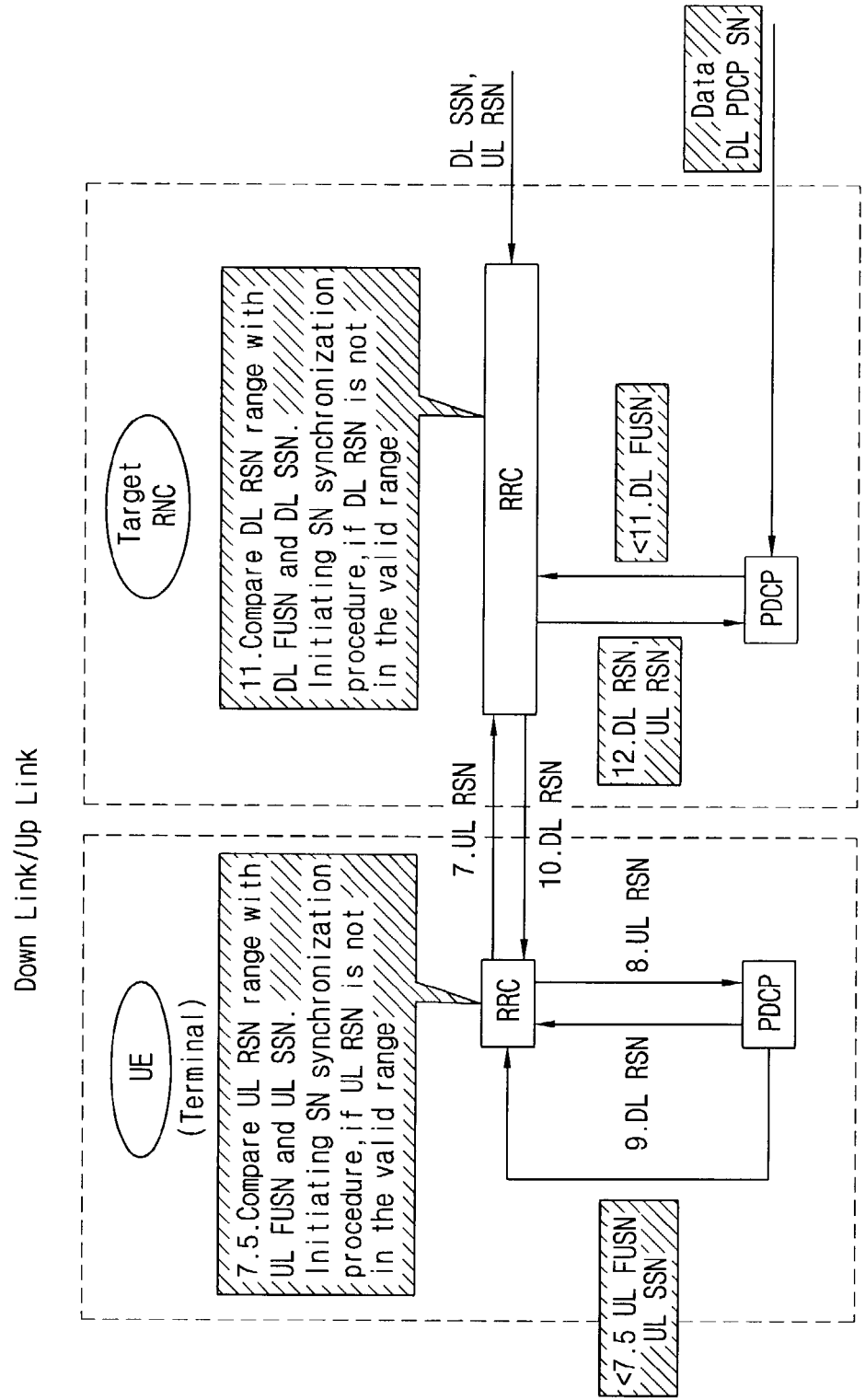
FIG. 12 illustrates a view showing a validity test for sequence number (SN) performed by RRC according to another embodiment of the present invention.

FIG. 12 illustrates the processes of validity test for the SNs being performed in RRC according to another embodiment of the present invention.

Herein, steps 1~6 are the same as those of FIGS. 11a and 11b, and therefore, processes after $7^{th}$ process are shown in FIG. 12. FIG. 12 illustrates both up link and down link.

The RRC is not aware of the FUSN, and therefore, the RRC can start the test after receiving the information about the respective SNs from the PDCP. For example, the UE RRC should be aware of the UL FUSN and UL SSN from the UE PDCP before step 7.5 (<$7.5^{th}$ process in FIG. 12), and the target RRC should be aware of the DL FUSN from the target PDCP before the step 11 (<$11^{th}$ process in FIG. 12). After getting the above information, the UE RRC and the target RRC are able to perform the validity tests for the UL RSN and for the DL RSN. (steps 7 and 11 in FIG. 12), respectively.

If each respective RSN value is within the valid range, the RRC notifies the PDCP of the value. If the RSN value is out of the valid range, the RRC commands the PDCP to perform the SN synchronization.

The present invention suggests that the SN synchronization should be started by the decision of the PDCP itself in case of using the above validity test in the PDCP.

However, there are some cases that the SN synchronization processes are required in response to the decision of the PDCP although the PDCP does not perform the validity test.

One of the above cases, as an example, is that a gap in SNs is generated between the unconfirmed SDUs stored in the PDCP sender (source PDCP) during the LSR. For lossless transmission, the PDU corresponding to the gap SN need to be transmitted.

The gap SN (or SN having a gap) is generated by the header compression. The header compression is for compressing the IP header in the PDCP SDU, and is one of the functions of the PDCP. When the header compression is made in the PDCP, the algorithms used in the sender and in the receiver should be same as each other.

However, the receiver transmits feedback information to the sender sometimes when the header compression is used. The feedback information is transmitted in the PDCP PDU form, and the PDCP PDU is not generated from the PDCP SDU, but is generated by the PDCP itself.

The GTP-U SNs are added to all the PDCP SDUs, and the PDCP SNs are added to all PDCP PDUs, and therefore, the GTP-U SNs and the PDCP SNs may not have one-to-one correspondence with each other due to the above feedback information.

In addition, the header compression algorithms used before and after the LSR may be different from each other, and the feedback PDU, which is not confirmed, includes out-of-date information. Therefore, the feedback information is not transmitted to the target PDCP and discarded at the source PDCP.

Therefore, in above case, there is a gap between the PDCP SNs of the unconfirmed SDUs transmitted to the target PDCP. The conventional art does not take account of such gap, and therefore, there is a difference corresponding to a gap between the SSNs and the RSNs because the unconfirmed SDUs are transmitted in sequence. The sender PDCP and the receiver PDCP do not exchange the SNs with each other before the SN synchronization process is performed, and therefore, the SN difference between the sender PDCP and the receiver PDCP by the gap SN is not recognized. And after that, if the LSR is generated again, the SDUs are damaged due to the SN difference.

In order to solve the above problems, two exemplary methods are suggested by the present invention.

Figure 13:
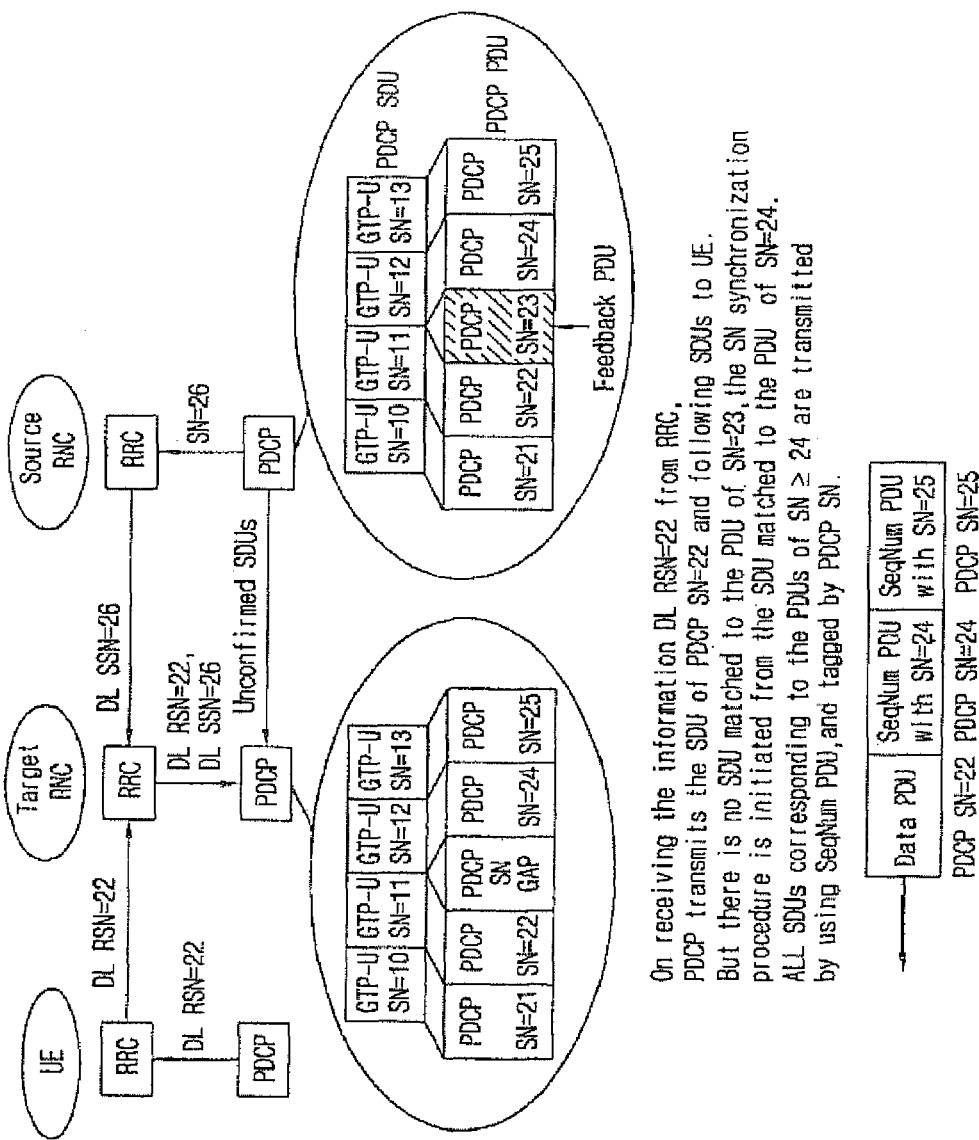
FIG. 13 illustrates a first example of a method that the SDU corresponding to a SN next to a gap SN is transmitted as a SeqNum PDU form after starting SN synchronization process by the PDCP itself in case that a gap SN is generated.

FIG. 13 is a view showing a first example of a method that the SN synchronization process is started by the PDCP in case that the gap SN is generated, and the SDU corresponding to the SN next to the gap SN is transmitted as SeqNum PDU form.

If it is assumed that the unconfirmed PDUs of the source PDCP are the PDUs corresponding to the SN=21~25 when the LSR is generated or activated, and that the PDU of SN=23 is feedback PDU, the SN=23 is not forwarded to the target PDCP.

Therefore, the target PDCP stores the SDUs except the SN=23. When the target RRC notifies the target PDCP of the first DL PDCP SN=22, the PDCP should start the transmission from the SDU corresponding to the SN=22.

In addition, there is no PDU of SN=23 after the PDU of SN=22 was transmitted, and therefore, the PDCP decides that there is an SN gap and starts the SN synchronization process for the SDUs next to the gap SN. The SDUs SN=24 and higher are all transmitted using the SeqNum PDUs. When the receiver receives the data PDU of SN=22, the receiver updates the PDU as SN=23. After that, when the receiver receives the SeqNum PDU of SN=24, and then, updates the RSN to be 24. Therefore, the SN synchronization between the sender and the receiver can be ensured as above.

As described above, FIG. 13 shows SN synchronization method for the gap SN in the target PDCP, however, the above method can be also used in the UE. That is, in case that there is a gap on the SNs of the unconfirmed SDUs in the UE, the SN synchronization process is started as described above.

Figure 14:
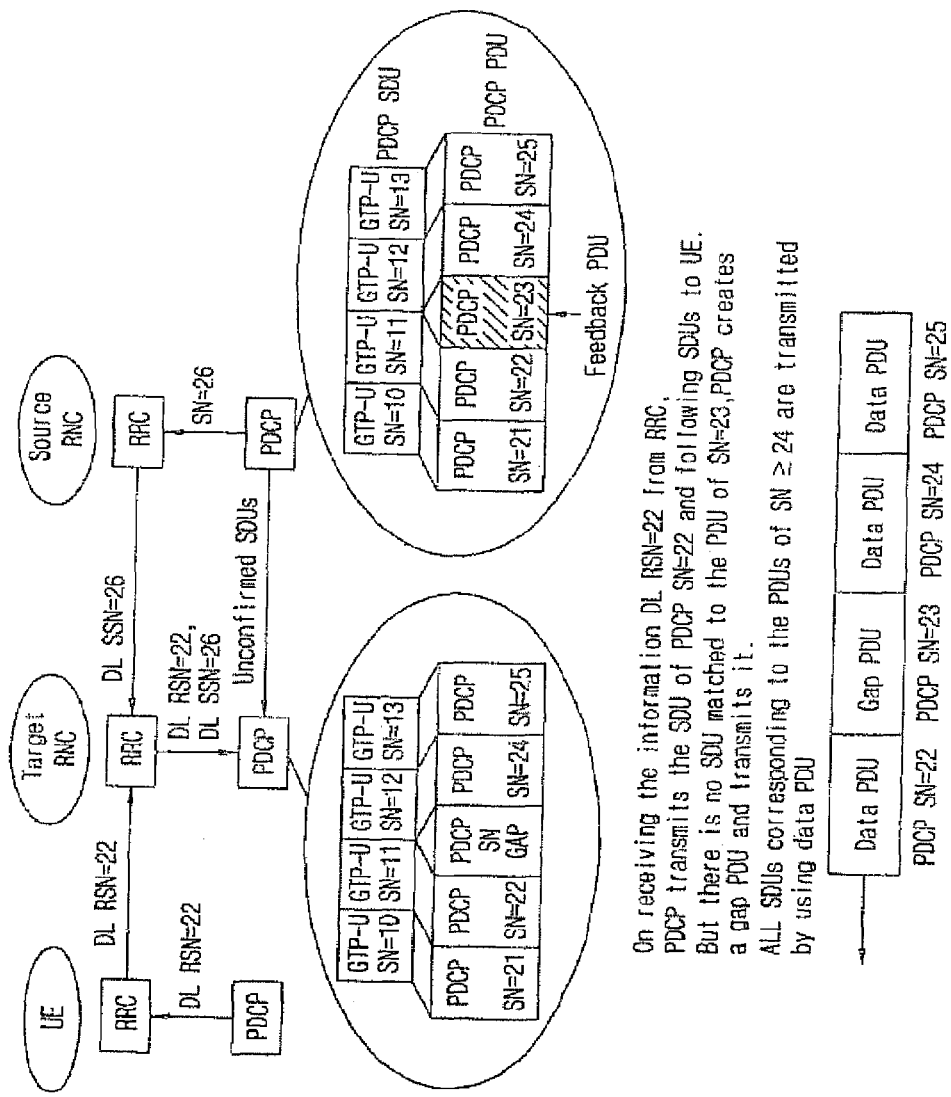
FIG. 14 illustrates a second example of a method for transmitting a gap PDU for the gap SN.

FIG. 14 is a view showing a second example of a method for transmitting a gap PDU for the gap SN.

That is, the second method is a method transmitting a gap PDU with no information when the gap is generated.

Herein, the gap PDU is transmitted for maintaining the continuity of the SN with no data. For example, the data PDU shown in FIG. 8 may be used as the gap PDU by transmitting the first 1 octet. When the gap PDU is transmitted for the gap SN, the synchronization between the SNs between the sender and receiver can be maintained without performing the SN synchronization process.

As described above, FIG. 14 shows the example of transmitting the gap PDU for the gap SN. In addition, the above method transmits the gap PDU instead of performing the SN synchronization when the gap SN is generated.

Herein, the SN=23 is the gap SN, and therefore, the gap PDU for the SN=23 is made and transmitted. There are various kinds of the gap PDU, and their common object is to synchronize the SNs of the sender and of the receiver. FIG. 14 shows the target PDCP, however, the above method may also used in the UE PDCP.

As described above, according to the present invention, the PDCP protocol structure is wholly reconstructed in order to support the LSR in the packet service domain, and controlling information and operational procedure required are newly defined. Thereby, the lossless SRNS relocation may be made in the packet service domain, and the mobility in the data communication is ensured completely.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for transmitting packet data from a transmitting unit to a receiving unit in a radio network, the method comprising:
   receiving a receive sequence number from the receiving unit;
   determining whether the receive sequence number is in a valid range by using at least a first unconfirmed data unit sequence number and a send sequence number, wherein the receive sequence number is in an invalid range if the receive sequence number is one of less than the first unconfirmed data unit sequence number and greater than the send sequence number; and
   initiating a sequence number synchronization if the receive sequence number is in the invalid range.

2. The method of claim 1, wherein the transmitting unit comprises at least lower and upper layer protocols, each upper layer protocol set on top of the corresponding lower layer protocol.

3. The method of claim 2, wherein the lower layer protocol of the transmitting unit determines whether the receive sequence number is in the valid range.

4. The method of claim 3, wherein the lower layer protocol of the transmitting unit is a packet data convergence protocol layer.

5. The method of claim 2, wherein the sequence number synchronization is initiated by the lower layer protocol of the transmitting unit.

6. The method of claim 5, wherein the lower layer protocol of the transmitting unit is a packet data convergence protocol layer.

7. The method of claim 1, wherein the radio network comprises at least a first radio network controller and a second radio network controller, each radio network controller comprising at least lower and upper layer protocols, each upper layer protocol set on top of the corresponding lower layer protocol.

8. The method of claim 7, wherein the first radio network controller is a source radio network controller and the second radio network controller is a target radio network controller.

9. The method of claim 7, wherein the upper layer protocol of the first radio network controller is a radio resource control layer and the lower layer protocol of the first radio network controller is a packet data convergence protocol layer.

10. The method of claim 7, wherein the upper layer protocol of the second radio network controller is a radio resource control layer and the lower layer protocol of the second radio network controller is a packet data convergence protocol layer.

11. The method of claim 1, further comprising initiating transmission of packet data from the transmitting unit if the receive sequence number is in the valid range, the transmission beginning with a data unit corresponding to the receive sequence number.

12. A method for transmitting packet data from a transmitting unit to a receiving unit in a radio network, the method comprising:
receiving a receive sequence number from the receiving unit;
receiving a first unconfirmed data unit sequence number and a send sequence number, the send sequence number corresponding to a first unsent data unit;
determining whether the receive sequence number is in a valid range by using at least the first unconfirmed data unit sequence number and the send sequence number, wherein the receive sequence number is in an invalid range if the receive sequence number is one of less than the first unconfirmed data unit sequence number and greater than the send sequence number; and
initiating a sequence number synchronization if the receive sequence number is in the invalid range.

13. The method of claim 12, wherein the radio network comprises at least a first radio network controller and a second radio network controller, each radio network controller comprising at least lower and upper layer protocols, each upper layer protocol set on top of the corresponding lower layer protocol.

14. The method of claim 13, wherein the transmitting unit is a target radio network controller and the receiving unit is a mobile terminal.

15. The method of claim 13, wherein the sequence number synchronization is initiated by the lower layer protocol of the second radio network controller.

16. The method of claim 13, wherein the sequence number synchronization is initiated by the upper layer protocol of the second radio network controller.

17. The method of claim 13, wherein the lower layer protocol of the second radio network controller determines whether the receive sequence number is in the valid range.

18. The method of claim 13, wherein the upper layer protocol of the second radio network controller determines whether the receive sequence number is in the valid range.

19. The method of claim 13, wherein the upper layer protocol of the first radio network controller is a radio resource control layer and the lower layer protocol of the first radio network controller is a packet data convergence protocol layer.

20. The method of claim 13, wherein the upper layer protocol of the second radio network controller is a radio resource control layer and the lower layer protocol of the second radio network controller is a packet data convergence protocol layer.

21. The method of claim 13, wherein the second radio network controller receives unconfirmed data units and corresponding sequence numbers from the first radio network controller synchronously.

22. The method of claim 13, wherein the lower layer protocol of the second radio network controller receives unconfirmed data units and corresponding sequence numbers from the lower layer protocol of the first radio network controller.

23. The method of claim 13, wherein the upper layer protocol of the second radio network controller receives the send sequence number from the upper layer protocol of the first radio network controller.

24. The method of claim 13, wherein the upper layer protocol of the second radio network controller receives the receive sequence number from an upper layer protocol of the receiving unit.

25. The method of claim 12, further comprising initiating transmission of packet data from the transmitting unit if the receive sequence number is in the valid range, the transmission beginning with a data unit corresponding to the receive sequence number.

26. A mobile communication device for transmitting packet data to a radio network comprising at least a first radio network controller and a second radio network controller, the mobile communication device comprising:
transmitting means transmitting at least a portion of the packet data to the first radio network controller and transmitting at least a portion of the packet data to the second radio network controller;
receiving means receiving a receive sequence number from the first radio network controller via the second radio network controller;
control means determining whether the receive sequence number is in a valid range and initiating a sequence number synchronization if the receive sequence number is in an invalid range, wherein the determination is made using at least a first unconfirmed data unit sequence number and a send sequence number and the receive sequence number is in the invalid range if the receive sequence number is one of less than the first unconfirmed data unit sequence number and greater than the send sequence number.

27. The mobile communication device of claim 26, wherein the communication device comprises at least lower and upper layer protocols, the upper layer protocol set on top of the lower layer protocol.

28. The mobile communication device of claim 27, wherein the lower layer protocol of the mobile communication device determines whether the receive sequence number is in a valid range.

29. The mobile communication device of claim 27, wherein the lower layer protocol of the mobile communication device initiates the sequence number synchronization.

30. The mobile communication device of claim 27, wherein the lower layer protocol of the mobile communication device is a packet data convergence protocol layer and the upper layer protocol of the mobile communication device is a radio resource control layer.

31. The mobile communication device of claim 26, wherein the first radio network controller is a serving radio network controller and the second radio network controller is a target radio network controller.

32. The mobile communication device of claim 26, wherein the control means further initiates transmission of packet data if the receive sequence number is in the valid range, the transmission beginning with a data unit corresponding to the receive sequence number.

33. A radio network for transmitting packet data to a mobile communication device, the radio network comprising:

a first radio network controller; and a second radio network controller, wherein the first radio network controller transmits unconfirmed data units, a first unconfirmed data unit sequence number and a send sequence number to the second radio network controller, the send sequence number corresponding to a first unsent data unit and the second radio network controller receives a receive sequence number from the mobile communication device, forwards at least a portion of the unconfirmed data units received from the first radio network controller to the mobile communication device, determines whether the receive sequence number is in a valid range and initiates a sequence number synchronization if the receive sequence number is in an invalid range, wherein the determination is made using at least the first unconfirmed data unit sequence number and the send sequence number and the receive sequence number is in the invalid range if the receive sequence number is one of less than the first unconfirmed data unit sequence number and greater than the send sequence number.

34. The radio network of claim 33, wherein the first radio network controller and the second radio network controller each comprise at least lower and upper layer protocols and transmits at least a portion of the packet data to the mobile communication device.

35. The radio network of claim 34, wherein the lower layer protocol of the second radio network controller initiates the sequence number synchronization.

36. The radio network of claim 34, wherein the upper layer protocol of the second radio network controller initiates the sequence number synchronization.

37. The radio network of claim 34, wherein the lower layer protocol of the second radio network controller determines whether the receive sequence number is in the valid range.

38. The radio network of claim 34, wherein the upper layer protocol of the first radio network controller is a radio resource control layer and the lower layer protocol of the first radio network controller is a packet data convergence protocol layer.

39. The radio network of claim 34, wherein the upper layer protocol of the second radio network controller is a radio resource control layer and the lower layer protocol of the second radio network controller is a packet data convergence protocol layer.

40. The radio network of claim 34, wherein the first radio network controller forwards the unconfirmed data units and corresponding sequence numbers to the second radio network controller synchronously.

41. The radio network of claim 34, wherein the lower layer protocol of the first radio network controller provides the unconfirmed data units and corresponding sequence numbers to the lower layer protocol of the second radio network controller.

42. The radio network of claim 34, wherein the upper layer protocol of the first radio network controller provides the send sequence number to the upper layer protocol of the second radio network controller.

43. The radio network of claim 34, wherein the upper layer protocol of the second radio network controller receives the receive sequence number from the upper layer protocol of the mobile communication device.

44. The radio network of claim 33, wherein the second radio network controller further initiates transmission of packet data if the receive sequence number is in the valid range, the transmission beginning with a data unit corresponding to the receive sequence number.

45. The radio network of claim 33, wherein the upper layer protocol of the second radio network controller determines whether the receive sequence number is in the valid range.

* * * * *